US008533110B2

(12) United States Patent
Kremen et al.

(10) Patent No.: US 8,533,110 B2
(45) Date of Patent: Sep. 10, 2013

(54) METHODS AND APPARATUS FOR VERIFYING EMPLOYMENT VIA ONLINE DATA

(75) Inventors: Gary Kremen, Menlo Park, CA (US); Eric King, Redwood City, CA (US); Norman Kremen, Lincolnwood, IL (US)

(73) Assignee: Sociogramics, Inc., Menlo Park, CA (US)

( * ) Notice: Subject to any disclaimer, the term of this patent is extended or adjusted under 35 U.S.C. 154(b) by 0 days.

(21) Appl. No.: 13/538,879

(22) Filed: Jun. 29, 2012

(65) Prior Publication Data
US 2013/0013489 A1    Jan. 10, 2013

Related U.S. Application Data

(63) Continuation-in-part of application No. 13/114,979, filed on May 24, 2011, and a continuation-in-part of application No. 13/114,989, filed on May 24, 2011, application No. 13/538,879, which is a continuation-in-part of application No. 13/308,465, filed on Nov. 30, 2011.

(60) Provisional application No. 61/504,130, filed on Jul. 1, 2011, provisional application No. 61/548,111, filed on Oct. 17, 2011, provisional application No. 61/565,451, filed on Nov. 30, 2011, provisional application No. 61/596,228, filed on Feb. 8, 2012, provisional application No. 61/614,480, filed on Mar. 22, 2012, provisional application No. 61/467,381, filed on Mar. 25, 2011, provisional application No. 61/436,523, filed on Jan. 26, 2011, provisional application No. 61/359,766, filed on Jun. 29, 2010.

(51) Int. Cl.
*G06Q 40/00*    (2012.01)

(52) U.S. Cl.
USPC .................................. 705/38; 705/1; 705/35

(58) Field of Classification Search
USPC ............................................................ 705/38
See application file for complete search history.

(56) References Cited

U.S. PATENT DOCUMENTS 6,195,648 B1    2/2001    Simon et al.
7,107,241 B1    9/2006    Pinto (Continued)

OTHER PUBLICATIONS

Karlan et al., "Trust and Social Collateral," Quarterly Journal of Economics, Oct. 2008, 41 pages, Issue 124, No. 3.

(Continued)

*Primary Examiner* — Jason M Borlinghaus
*Assistant Examiner* — Hao Fu
(74) *Attorney, Agent, or Firm* — Perkins Coie LLP

(57) ABSTRACT

A computer-implemented method for verifying employment of a first user with a computer system programmed to perform the method includes receiving a first name for a user-represented employer via a user-application, receiving a first plurality of social network data associated with the first user from a first social network server, wherein the first plurality of social network data includes a second name associated with an user-represented employer via a user-profile on the first social network, determining a relationship between the employer associated with the first name and the employer associated with the second name, in response to the first name and to the second name, determining an employment verification indicator in response to the relationship between the employer associated with the first name to the employer associated to the second name and outputting with the computer system, the employment verification indicator.

17 Claims, 12 Drawing Sheets

(56) References Cited

U.S. PATENT DOCUMENTS

| | | | |
|---|---|---|---|
| 7,212,995 B2 | 5/2007 | Schulkins | |
| 7,478,064 B1 | 1/2009 | Nacht | |
| 7,949,593 B2 | 5/2011 | Norris | |
| 7,983,951 B2 | 7/2011 | Frohwein et al. | |
| 2002/0062342 A1* | 5/2002 | Sidles | 709/203 |
| 2002/0116322 A1 | 8/2002 | Schnall | |
| 2002/0116323 A1 | 8/2002 | Schnall | |
| 2004/0177031 A1 | 9/2004 | Shapiro et al. | |
| 2005/0216824 A1 | 9/2005 | Ferguson et al. | |
| 2007/0185806 A1 | 8/2007 | Serio et al. | |
| 2008/0133391 A1 | 6/2008 | Kurian et al. | |
| 2008/0133402 A1 | 6/2008 | Kurian et al. | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2009/0164364 A1 | 6/2009 | Galit et al. | |
| 2009/0171686 A1 | 7/2009 | Eberstadt | |
| 2009/0228294 A1 | 9/2009 | Choi et al. | |
| 2009/0234677 A1 | 9/2009 | Arezina | |
| 2009/0281840 A1 | 11/2009 | Hersch | |
| 2009/0313166 A1 | 12/2009 | McNab | |
| 2010/0153185 A1 | 6/2010 | Ghosh et al. | |
| 2010/0161477 A1 | 6/2010 | Galit et al. | |
| 2010/0174624 A1 | 7/2010 | Nasser et al. | |
| 2010/0191655 A1 | 7/2010 | Corn | |
| 2010/0241559 A1 | 9/2010 | O'Connor et al. | |
| 2010/0268655 A1 | 10/2010 | Cheuoua | |
| 2011/0112957 A1 | 5/2011 | Ingram et al. | |
| 2011/0231240 A1* | 9/2011 | Schoen et al. | 705/14.41 |
| 2012/0150973 A1 | 6/2012 | Barak | |
| 2012/0191594 A1* | 7/2012 | Welch et al. | 705/38 |
| 2012/0226701 A1* | 9/2012 | Singh | 707/748 |

OTHER PUBLICATIONS

"Social Capital," www.unionmicrofinanza.com, 1 page, http://www.unionmicrofinanza.com/umf/research/network_analysis/social_capital.

KABBAGE, "Kabbage Issued First Patent," www.kabbage.com/content/pdf/patent7983951pr.pdf, Aug. 17, 2011, 1 page.

Work for Pie Inc, www.workforpie.com, downloaded on Aug. 24, 2011, 2 pages.

Payoff.com, www.payoff.com, copyright 2011, 1 page.

Reputation.com, Inc., www.reputation.com/board, copyright 2011, 3 pages.

Big Door Media, www.bigdoor.com, copyright 2011.

Bunchball, Inc., www.bunchball.com, copyright 2011, 1 page.

Gamify, Inc., www.gamify.com, copyright 2011, 1 page.

Badgeville., www.badgeville.com, copyright 2011, 2 pages.

Smarterer, Inc., www.smarterer,com, copyright 2011, 3 pages.

Facebook, www.facebook.com/badges, copyright 2011, 1 page.

Gowalla.com. www.gowalla.com, copyright 2011, 2 pages.

Foursquare, www.foursquare.com, copyright 2011, 1 page.

Facebook, Inc., http://www.facebook.com/note.php?note_id=55257228858&ref=mf, copyright 2011, 1 page.

Co-Pending U.S. Appl. No. 13/179,503 of Gary Kremen, filed Jul. 9, 2011.

Co-Pending U.S. Appl. No. 13/114,989 of Gary Kremen, filed May 24, 2011.

Co-Pending U.S. Appl. No. 13/179,504 of Gary Kremen, filed Jul. 9, 2011.

Co-Pending U.S. Appl. No. 13/308,465 of Gary Kremen, filed Nov. 30, 2011.

International Search Report of PCT Application No. PCT/2011/42457, Dec. 28, 2011, 5 pages.

Written Opinion of PCT Application No. PCT/2011/42457, Dec. 28, 2011, 4 pages.

International Search Report of PCT Application No. PCT/2011/042459, Jun. 29, 2011, 5 pages.

Written Opinion of PCT Application No. PCT/2011/042459, Jun. 29, 2011, 7 pages.

Restriction Requirement mailed Aug. 7, 2012 in Co-Pending U.S. Appl. No. 13/179,503 of Gary Kremen, filed Jul. 9, 2011.

Restriction Requirement mailed Jun. 12, 2012 in Co-Pending U.S. Appl. No. 13/179,504 of Gary Kremen, filed Jul. 9, 2011.

Restriction Requirement mailed Jul. 2, 2012 in Co-Pending U.S. Appl. No. 13/308,465 of Gary Kremen, filed Nov. 30, 2011.

Co-Pending U.S. Appl. No. 13/114,979 of Gary Kremen, filed Jun. 29, 2010.

Restriction Requirement mailed Sep. 11, 2012 in Co-Pending U.S. Appl. No. 13/114,979 of Gary Kremen, filed May 24, 2011.

Non-Final Office Action mailed Oct. 19, 2012 in Co-Pending U.S. Appl. No. 13/179,503 of Gary Kremen, filed Jul. 9, 2011.

Non-Final Office Action Mailed Aug. 31, 2012 in Co-Pending U.S. Appl. No. 13/114,989 of Gary Kremen, filed May 24, 2011.

Non-Final Office Action Mailed Sep. 20, 2012 in Co-Pending U.S. Appl. No. 13/308,465 of Gary Kremen, filed Nov. 30, 2011.

* cited by examiner

Cash 4 YouOnline.com

① General Information → ② Employment & Bank Information → ③ Submit Application

General Information

Amounted Requested: $500
First Name: Gary
Middle Initial:
Last Name: Kremen

Home Address: 284 San Antonio Rd
Zip Code: 94040
City: Mountain View

State: California
Time at residence: 1 month
Residence Type: Own

Email: gkremen@aol.com
Drivers License or State ID #: d1234567
Issuing State: California Phone: 650 - 209 - 5422
Cell Phone: 650 - 209 - 5422 (Optional)

Date of Birth: Sep (9) 20 1963
Social Security: 457 - 55 - 5462

Authenticate your identity with Facebook and LinkedIn!

Facebook provides us a way to prevent fraudulent online borrowing practices. A confirmed social identity is an important factor for us to expedite your loan approval process.

We will never post anything to your wall or tell your friends you have applied for a loan. We understand this application is a private matter and we keep this information fully secured and confidential. Learn more

 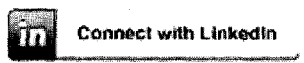

FIG. 5A

Employment Information

Income Source
[ Job Income ▼ ]

Employer Name
[ Sociogramics ]

Monthly Income
[ 20000 ]

Time Employed
[ 1 month ▼ ]

Work Phone #
( 415 ) 305 - 3052

Job Title
[ CEO ]  ⟵ 800

Pay Frequency
[ Bi-weekly ▼ ]

Where Do We Send You

Bank Account #
[ 10321547890 ]

Bank Name
[ Bank of America ]

(ⓧ) Verify your Work Email Address

Please enter your work email address below

We will send a code to this email address to verify your employment at "X". Confirming your employment may expedite your chances of approval.

[ Work email address ]  [ Send ]

I don't have a work email address

Are you or are you the dependent of someone employed by a branch of the U.S. Military?
○ Yes   ● No Are you a U.S. Citizen over the age of 18?
● Yes   ○ No

METHODS AND APPARATUS FOR VERIFYING EMPLOYMENT VIA ONLINE DATA

CROSS-REFERENCE TO RELATED APPLICATIONS

The present application claims priority to App. No. 61/504,130 filed Jul. 1, 2011; App. No. 61/548,111 filed Oct. 17, 2011; App. No. 61/565,451 filed Nov. 30, 2011; App. No. 61/596,228 filed Feb. 8, 2012; and App. No. 61/614,480 filed Mar. 22, 2012. The present application is a continuation-in-part of application Ser. No. 13/114,979 filed May 24, 2011 that claims priority from Prov. Apps. 61/467,381 filed Mar. 25, 2011, 61/436,523 filed Jan. 26, 2011 and 61/359,766 filed Jun. 29, 2010; a continuation-in-part of application Ser. No. 13/114,989 filed May 24, 2011 that claims priority from Prov. Apps. 61/467,381 filed Mar. 25, 2011, 61/436,523 filed Jan. 26, 2011 and 61/359,766 filed Jun. 29, 2010; and a continuation-in-part of application Ser. No. 13/308,465 filed Nov. 30, 2011 that claims benefit of Prov. Apps. 61/436,523 filed Jan. 26, 2011 and 61/647,381 file Mar. 25, 2011. These disclosures are incorporated by reference herein for all purposes.

BACKGROUND

The present invention relates to user data verification. In specific embodiments, the invention relates to verification of a user's current employment, a user's current educational status, or the like.

Potential financial risk takers (risk takers) often desire to verify representations made by a user, before taking a financial risk on behalf of the user. As an example, many risk takes desire to verify a user's employment and/or cash flow to determine whether the user is likely to satisfy the user's obligations to the risk taker. The verification (or validation) may be desirable for a variety of purposes, such as for payday loans, installment loans, revolving credit such as credit cards, auto loans, leases, rentals of property, loans secured by real property, loans secured by personal property, insurance arrangements, vendors that grant credit such as phone companies and utilities, financial transactions, employment, check cashing, and the like.

In addition to employment verification (e.g. validation), users might have other characteristics that can be verified by the risk taker to help them determine whether to take the risk on behalf of the user, i.e. income verification. Some of the other characteristics that may be verified may include the user's current compensation, length of employment at the employer, past employment history, stability of employment (e.g. has the user changed jobs frequently), "depth of relationships" at their employer (e.g. number of contacts with other employees of the company), educational history, current educational status, and the like.

The inventor is currently aware of, several common methods to verify employment of a user. One common technique has been a risk-taker (or an agent of the risk taker) directly calling the Human Resource Department (or user's superior) of a company, organization, or the like to verify the user's employment. One drawback to such an approach is that the size of the transaction may not justify the cost of contacting the purported employer. The fully weighted cost of such a phone call (including potential "phone tag") is believed to be around $5-$20. Another drawback to such an approach is that it is often difficult for one to locate the appropriate Human Resource Department or to locate the user's superior. Another drawback is that the user might give out a friend's or a contact's name and number, who then poses as an HR Resources Department or superior. That person may then give the risk taker/caller false information that could induce the risk taker into granting the user credit. Yet another drawback is the delay in the time it takes to confirm employment by calling. For example an employer might not be open 24 hour per day, 7 days per week for employment verification purposes. Further as it can be imagined, to an employer, the verification of employment of a current or former employee is typically a low priority matter, and some employers may take days before responding to a request. Another drawback is that these types of verifications can be embarrassing to the employee, i.e. an invasion of privacy.

Another technique has been the use of a contributory data model. In such a model, third party employment verification service providers (i.e. fee-based, TALX) review submitted user names against a database of employment records. To enable this service, the service providers are typically granted specific access to different companies' employment record databases, or the like. One drawback to such an approach is that coverage of small to medium-sized employers, governments, and the like is very limited. In other words, such third party verification services typically only contract with large companies. It would not be worth the verification service's time to set up a relationships with the millions of small to medium-sized employers and to have them contribute their employment records into the shared database. This is especially believed to be true because of the small demand and small number of queries for the records of those small to medium-sized employers. Another drawback to such an approach is that such services are expensive, as they require significant infrastructure and on-going relationship management. Additional drawbacks are the amount of money charged by the third party employment verification service providers is material (between $5 and $20 per lookup in some cases); the databases are often out of date (e.g. >one month old); and that all large employers do not participate in such systems.

In light of the above, what is desired are ways to verify user representations of data on applications or the like without the drawbacks described above.

SUMMARY

The present invention relates to verification of user-represented data. In specific embodiments, the invention relates to verification of a user's current employment, a user's current educational status, or the like.

In some embodiments, a user provides a name of a company who they work for via an electronic application, or the like to a verification server. The user also authorizes the verification server to access selected data from the user's social profile in one or more social networks, such as the employer name, and the like. In various embodiments, the verification server compares the employer name on the user's application to the employer name on the user's social network profile to determine whether they are the same employer. Depending upon the degree of matching, the verification server returns an employment verification score and/or provides a user interface for viewing of the employment verification score, and the like.

In some embodiments, a user provides a name of a company who they work for via an electronic application, or the like to a verification server. The user also authorizes the verification server to access selected data from the user's social profile in one or more social networks, such as social network contacts, and the like. In various embodiments, the verification server determines employer names for the user's social network contacts, and compares the employer name on the user's application to employer's of the user's social network contacts. The verification server identifies how many social network contacts of the user are the same as the employer provided by the user and determines an employment verification score. In some embodiments, the amount of communication between each of the identified social network contacts and/or the user are determined. Depending upon the number of social network contacts at the same employer and/or the quality of communication there between, the verification server determines an employment verification score. In some embodiments, the verification server then outputs the employment verification score and/or provides a user interface for viewing of the employment verification score, and the like. In some embodiments, the number of users in common are also used.

In some embodiments, a user provides a name of a company who they work as well as a work e-mail address/telephone number for via an electronic application, or the like to a verification server. In various embodiments, the verification server determines whether the work e-mail address is associated with the company. If so, the verification server sends a communication to the user to the work e-mail address requiring the user to confirm the e-mail address. In various embodiments, the confirmation may take the form of requiring the user to .click upon a specific web link, send a reply e-mail, call a specific telephone number, or the like. In some embodiments, instead of the verification server sending an e-mail to the user's work e-mail address, the user initiates the process by sending an e-mail to the verification server from the user's work e-mail address. Depending upon whether the user replies and/or when the user replies, the verification server determines an employment verification score. In some embodiments, the verification server then outputs the employment verification score and/or provides a user interface for viewing of the employment verification score, and the like.

In various embodiments, the inventor has recognized that multiple electronic data sources can be used to determine or verify user employment. In general, two or more such electronic data sources may be accessed and compared to determine the likelihood that the user is actually employed by a particular employer. The likelihood is typically represented as a percentage, a score, or the like. Some of the electronic data sources may include:

- employment data provided by the user on an electronic application;
- employment data represented by the user on one or more social networks (it also could be represented by third parties);
- employment data of the user that is derived from a social graph of the user on one or more social networks;
- verification of a company or employer associated with the user's corporate e-mail address (taking advantage of the fact that corporations typically only allow current employees to have corporate email addresses). In some embodiments, the e-mail prefix is often set using a certain formula, e.g. "user_firstname.user_lastname";
- employer data that can be derived from an IP address from where the user is submitting an application from (usually only employees have access to a corporate network that has one or more corporate IP address associated therewith);
- employer data that can be derived from a tax return, W2 form, or the like;
- employer data that can be derived from a user-provided work telephone number;
- employer data that can be derived from a work e-mail address of the user;
- employer data that can be derived from one or more publically-available and/or fee-based databases, data source, data aggregators (e.g. Spokeo.com);
- employer data that can be derived from one or more bank account depository data (e.g. ACH header data from a direct deposit from an employer) (e.g. WellsFargo.co-derived data, Yodlee.com-derived, Mint.com-derived data);
- a user selection of an employer name from a drop-down list or auto complete list (e.g. from a list of actual employers);
- a text submission (e.g. a web form, "app.") by the user; and the like.

In various embodiments, at least two of the above sources may be compared to determine an employment verification score. In some embodiments the degree of matching between at least two of the above sources is taken into account. In some embodiments, if the initial employment verification score with two sources is below a threshold, one or more other sources of employment data, described above, may be requested/accessed. In some cases, the additional sources of employment data may increase or decrease the employment verification score.

In some embodiments, the employment verification score may be returned to an employment verification requester in a web-based dashboard type graphical user interface, an e-mail message, XML response or the like. The employment verification requester may be a potential employer, a money lending company (e.g. a mortgage company (e.g. Bank of America, Wells Fargo), a pay-day loan company, an automobile loan company (e.g. credit union, automobile company finance company), a lessor (e.g. rental company), other financial risk takers (e.g. life insurance company, an underwriter)), remittance providers, cash advances, check cashing, or the like, as discussed above.

Employments of the present invention relates to employment verification and/or scoring. The methods described below are computer-implemented techniques performed on one or more computer systems that are specifically programmed by executable software code to perform the functions described below. A general-purpose computer having a processor, a memory, and a network connection may be programmed by this executable software code to become a special purpose computer system that performs this functionality. In some embodiments, the general-purpose computer may include a display, a user entry device (e.g. keyboard, mouse), and the like. In some embodiments, the special purpose computer system may communicate with other special purpose computer systems, such as a database, remote server, a user machine, a security server, or the like, via the network connection. Some embodiments may be executed on such a general-purpose computer and the functionality of such embodiments may be available via one or more callable application program interfaces (APIs), XML, and the like. In certain cases, an API call can be performed with a website address with an oAuth token, or the like. In some cases, the computer system may be a desktop computer, laptop computer, mobile phone (iPhone, GalaxyS3), tablet device (e.g. iPad), mobile terminal, kiosk, and the like.

According to one aspect of the invention, a computer-implemented method for verifying employment of a first user with a computer system programmed to perform the method is disclosed. One method includes receiving with the computer system, a first name associated with an organization represented by the first user as an employer on a user-application, and receiving with the computer system, a first plurality of social network data associated with the first user from a first social network server, wherein the first plurality of social network data includes a second name associated with an organization represented by the first user as an employer on a user-profile on the first social network, wherein the first social network server comprises a network server provided by, for example: Facebook, Google+, Twitter, LinkedIn, Plaxo, MySpace, e-mail. One process includes determining with the computer system, a relationship between the organization associated with the first name and the organization associated with the second name, in response to the first name and to the second name, and determining with the computer system, an employment verification indicator in response to the relationship between the organization associated with the first name to the organization associated to the second name. One technique includes outputting with the computer system, the employment verification indicator.

According to another aspect of the invention, a computer system coupled to a first social network server for verifying employment of a first user with a computer system programmed to perform the method is described. One apparatus includes a memory configured to store a first name associated with an organization represented by the first user as an employer on a user-application. A system includes a processor coupled to the memory, wherein the processor is instructed by executable software code to receive, a first plurality of social network data associated with the first user from a first social network server, wherein the first plurality of social network data includes a second name associated with an organization represented by the first user as an employer on a user-profile on the first social network, wherein the first social network server comprises a network server associated with, for example: Facebook, Google+, LinkedIn, Plaxo, MySpace, e-mail, and the like, and wherein the processor is instructed by the executable software code to determine whether the organization associated with the first name is related to the organization associated with the second name, in response to the first name and to the second name. In some embodiments, the processor is instructed by the executable code to determine an employment verification indicator in response to a relatedness determination of the organization associated with the first name to the organization associated to the second name, and the processor is instructed by the executable code to output, the employment verification indicator.

According to another aspect of the invention, a computer-implemented method for verifying employment of a first user with a computer system programmed to perform the method is disclosed. One method includes receiving with the computer system, an OAuth token, or the like, to access social network data associated with a user from a social network selected from a group consisting of: LinkedIn, Facebook, Google+, and sending with the computer system, the OAuth token to the social network. One technique includes sending with the computer system, one or more API calls to the social network, receiving with the computer system, an identifier of a first organization represented by the first user as an employer in response to an on-line loan application process. A process includes receiving with the computer system, a first plurality of social network data associated with the social network, wherein the first plurality of social network data includes an identifier of a second organization represented by the first user as an employer, and determining with the computer system, whether the first organization is associated with the second organization in response to the identifier of the first organization and to the identifier of the second organization. A methodology may include determining with the computer system, an employment verification indicator in response to when the first organization is determined to be associated with the second organization, and outputting with the computer system the employment verification indicator. In other embodiments, publically-available data may be used to determine the employment verification score or indicator. This may include social network data of the user that is available to third-parties, without OAuth authorization, or the like. In other embodiments, publically-available data may include free data sources, fee-based data sources, or the like.

According to another aspect of the invention, a computer-implemented method for verifying employment of a user with a computer system programmed to perform the method is disclosed. One technique includes receiving with the computer system, an organization represented by the user as an employer on a user-application, and receiving with the computer system, an e-mail address provided by the user, wherein the e-mail address is represented by the user as an e-mail address of the user at the employer. A process may include determining with the computer system, whether the e-mail address provided by the user is associated with the employer, and determining with the computer system, an association indicator associated with the user in response to the domain name and/or prefix of the e-mail address provided by the user being determined to be associated with the employer. A method may include determining with the computer system an employment verification indicator associated with the user in response to the association indicator and outputting with the computer system the employment verification indicator.

According to another aspect of the invention, a computer-implemented method for determining in near real-time an employment verification score on a computer system programmed to perform the method, is disclosed. One method may include receiving in the computer system, a name of an individual, receiving in the computer system, an employer name, wherein the employer name is provided by the individual and is represented by the individual as an employer of the individual, and determining in the computer system, at least one e-mail domain names associated with the employer in response to the employer name. A technique may include determining in the computer system, at least one expected user names associated with the individual, in response to the employer name and in response to the name of the individual, determining in the computer system, at least one expected e-mail address associated with the individual in response to the e-mail domain name and the expected user name, and sending from the computer system, the expected e-mail address associated with the individual to an e-mail server associated with the e-mail domain name. A process may include determining in the computer system, whether the expected e-mail address associated with the individual is rejected from the e-mail server, and outputting from the computer system, an employment verification score associated with the individual in response to whether the expected e-mail address associated with the individual is rejected. In various embodiments, the expected e-mail address is sent to the e-mail server associated with the e-mail domain name via a port. In some examples, the port may be port 25, port 587, or the like.

According to another aspect of the invention, a computer system coupled for verifying employment of a first user with a computer system programmed to perform the method is described. One apparatus includes a memory configured to store an organization represented by the user as an employer on a user-application. A system includes a processor coupled to the memory, wherein the processor is instructed by executable software code to receive an e-mail address provided by the user, wherein the e-mail address is represented by the user as an e-mail address of the user at the employer, and wherein the processor is instructed by executable software code to determine whether the e-mail address provided by the user is associated with the employer. In some embodiments, the processor is instructed by executable software code to determine an association indicator associated with the user in response to the domain name of the e-mail address provided by the user being determined to be associated with the employer, the processor is instructed by executable software code to determine an employment verification indicator associated with the user in response to the association indicator, and wherein the processor is instructed by executable software code to output the employment verification indicator to a remote server.

According to another aspect of the invention, a computer-implemented method for verifying employment of a user with a computer system programmed to perform the method is disclosed. One technique includes receiving with the computer system, a first plurality of employment-related data for the user, and determining with the computer system, a first name associated with an organization in response to the first plurality of employment-related data. One process includes receiving with the computer system, a second plurality of employment-related data for the user and determining with the computer system, a second name associated with an organization in response to the second plurality of employment-related data. A method may include determining with the computer system, a relationship between the organization associated with the first name and the organization associated with the second name, in response to the first name and to the second name, determining with the computer system, an employment verification indicator in response to the relationship between the organization associated with the first name to the organization associated to the second name, and outputting with the computer system, the employment verification indicator.

According to yet another aspect of the invention, a system coupled for verifying employment of a first user with a computer system programmed to perform the method is disclosed. A device may include a memory configured to store executable software code. An apparatus may include a processor coupled to the memory, wherein the processor is instructed by the executable software code to receive a first plurality of employment-related data for the user, and wherein the processor is instructed by the executable software code to determine a first name associated with an organization in response to the first plurality of employment-related data. In various embodiments, the processor is instructed by the executable software code to receive a second plurality of employment-related data for the user, and wherein the processor is instructed by the executable software code to determine a second name associated with an organization in response to the second plurality of employment-related data. In some embodiments, the processor is instructed by the executable software code to determine a relationship between the organization associated with the first name and the organization associated with the second name, in response to the first name and to the second name, the processor is instructed by the executable software code to determine an employment verification indicator in response to the relationship between the organization associated with the first name to the organization associated to the second name, and the processor is instructed by the executable software code to output the employment verification indicator.

According to yet another aspect of the invention, a computer-implemented method for verifying educational history of a user with a computer system programmed to perform the method is disclosed. One technique includes receiving with the computer system, a first plurality of educational history-related data for the user, and determining with the computer system, a first name associated with an organization in response to the first plurality of educational history-related data. A process includes receiving with the computer system, a second plurality of educational history-related data for the user, and determining with the computer system, a second name associated with an organization in response to the second plurality of educational history-related data. A method includes determining with the computer system, a relationship between the organization associated with the first name and the organization associated with the second name, in response to the first name and to the second name, determining with the computer system, an educational history indicator in response to the relationship between the organization associated with the first name to the organization associated to the second name, and outputting with the computer system, the educational history indicator. In various embodiments, the educational history of the user is selected from a group consisting of: a school attended by the user, a school from which the user graduated, a school currently attended by the user. In various embodiments, such verifications may augment employment verification, income verification, e-mail verification, IP verification, and the like, as described herein.

According to yet another aspect of the invention, a computer-implemented method for determining a user work-stability indicator with a computer system programmed to perform the method is disclosed. One process includes receiving with the computer system, a first plurality of social network data associated with a user from a first social network server, wherein the first plurality of social network data includes a plurality of names associated with organizations represented by the first user as employers on a user-profile on the first social network, wherein the first social network server comprises a network server associated with: Facebook, Google+, Twitter, LinkedIn, Plaxo, MySpace, and a plurality of dates associated with the plurality of names, determining with the computer system, an employment stability indicator associated with the user in response to the plurality of names and plurality of dates, and outputting with the computer system, the employment verification indicator associated with the user.

In some embodiments, a verification server may store the data provided by the users, including, user name, IP address, purported employer, e-mail address, or the like in a database. As the stored data increases, the database may be used as an additional source of verification data. For example, valid formats of user e-mail prefixes for different company's can be determined, valid nicknames for company's can be determined, valid IP addresses associated with different company's can be determined, and the like. Accordingly, upon input of a subsequent user, the database may quickly determine the likelihood that the user works at the purported employer.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 5A-C illustrate a graphical user interfaces (GUIs) according to various embodiments of the present invention;

FIGS. 6A-C illustrate graphical user interfaces (GUIs) according to various embodiments of the present invention.

DETAILED DESCRIPTION

In various embodiments of the present invention, when a user desires to enter into a financial agreement with a risk taker, the risk taker may wish to verify or validate one or more assertions made by the user in a user-application. Some of these assertions may include employment, employment history, employment dates and stability, employment title or position, educational status, schools attended, residential address, and the like. In many cases if the user misrepresents themselves on the user-application, the risk taker may be hesitant to take on the risk (e.g. providing a loan, an installment loan, a payday loan, a mortgage, a credit card, a job, a rental, insurance, underwriting, etc.)

Figure 1A:
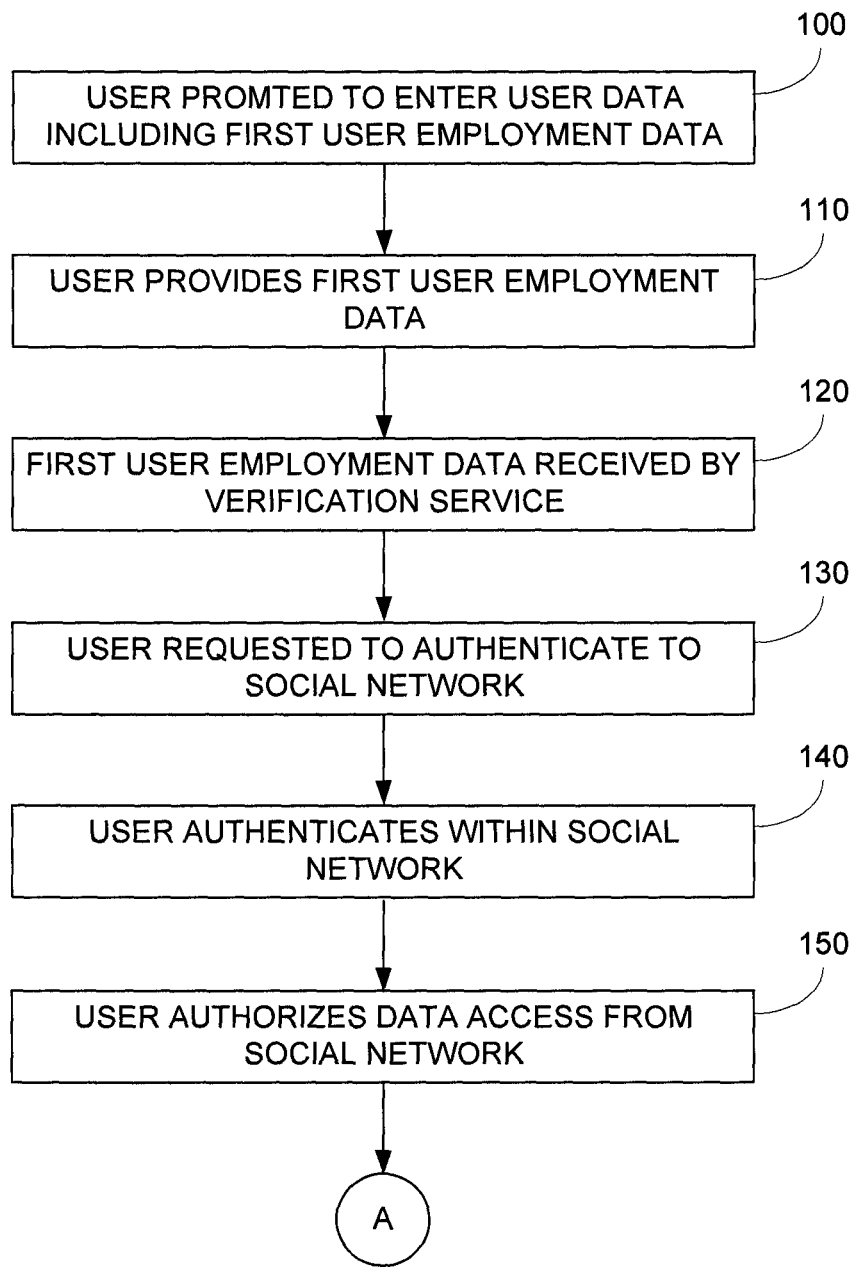
FIGS. 1A-B illustrate a block diagram of a process according to various embodiments of the present invention.
Figure 1B:
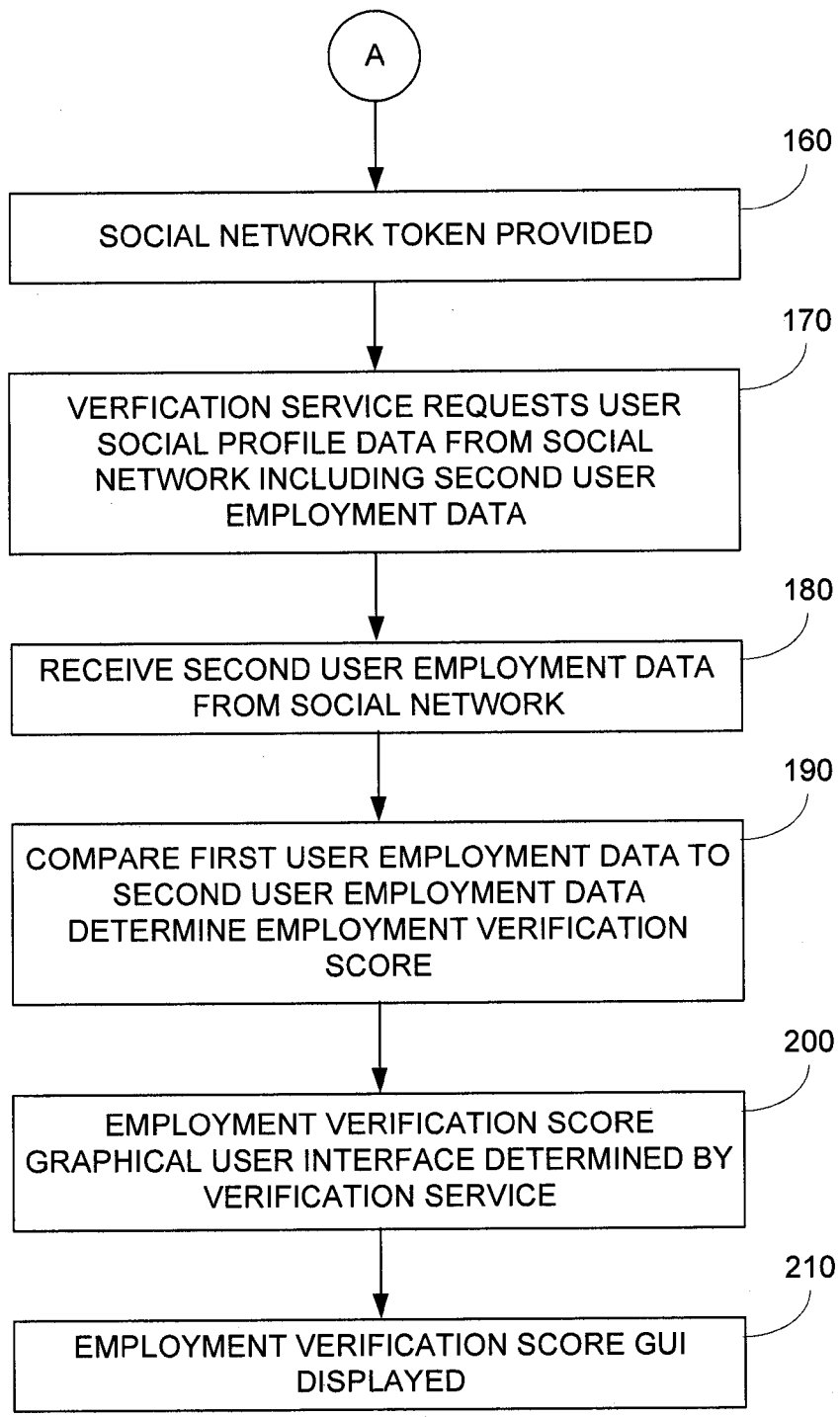

Employment Verification Concept—Social Network-Based Verification of User-Represented Employer FIGS. 1A-B illustrate a block diagram of a process according to various embodiments of the present invention. More specifically, FIGS. 1A-B illustrate embodiments of the verification methodology include retrieving and reviewing data provided by a user on the user's social graph.

In various embodiments, a user is prompted to fill in a user-application for a risk-taker in the context of an on-line web-site associated with a risk taker or a verification service, step 100. In other embodiments, the user may be prompted to enter data in a portable device application (e.g. Android app, iPhone app) provided by the risk taker or verification service. In still other embodiments, the user may be given a paper application by such parties.

In response, the user fills-in the user application, step 110. In various embodiments, the user may use a keyboard to enter user-application data electronically through a web-form submission, an application on a device (e.g. phone, tablet), a kiosk, or the like. In other embodiments, the user may write answers on paper, and the like. In typical applications, the user may make representations about themselves, such as their current employer, current position, current salary, length of time at the employer, address, educational accomplishments, and the like.

In some embodiments, the user-application data is received by a risk-taker or verification service, step 120. In some embodiments, the electronic data is received directly, and in other embodiments, the user application data is derived by optical character recognition techniques upon text entered by a user and/or upon fill-in-bubbles filled-in by a user, or the like.

As illustrated in FIGS. 1A-B, in some embodiments, the risk-taker or verification service requests that the user authenticate themselves via one or more social networks (e.g. Facebook, Google+, LinkedIn, Plaxo, or the like) as part of the application process, step 130. In some embodiments, the user is required to authenticate themselves before the user-application is considered, and in some embodiments, the user can be encouraged to authenticate themselves on a social network. As examples of the latter, the user may be offered a greater chance for approval, a lower interest rate, a lower repayment period, a lower premium, a lower monthly payment, or the like.

In various embodiments, the user authenticates themselves within the social network, typical via one or more API calls to the social network. Typically this is performed within the framework of the application process, step 140. As one example, during the application process, the user may click on a social network icon, e.g. Facebook, Google+, LinkedIn, Plaxo, ConnectCollect, or the like. In response, a login interface, provided by the social network, prompts the user for their authentication data (e.g. username/password). The user submits the requested data to the social network, and upon successful verification by the social network, the social network authenticates the user within the application process.

In various embodiments, in addition to the above authentication step, the user typically also authorizes what types of data they will allow to be retrieved from the social network, step 150. In some examples, data authorized to be retrieved from the social network may include social contacts of the user, employment data (e.g. employer names, positions, employment dates, etc.), educational data (e.g. schools attended, degrees earned, employment dates), address data, and the like.

In some embodiments of the present invention, social networks typically associate the user authentication and data authorization with a token or cookie that is provided to the risk-taker or verification service, step 160. In some embodiments, the token may be an oAuth token, OpenID token, or the like.

Next, in various embodiments, using the token, the risk-taker or verification service calls one or more Social Network APIs, and/or XML calls step 170. In response, the risk-taker or verification service receives data from the social profile of the user, step 180. In some embodiments directed to employment verification, the data received may include an employer name, employment dates, positions, salary, a supervisor name, a supervisor telephone, a user work telephone, or the like.

In various other embodiments described below, other types of social network data associated with the user may be returned, such as social contacts of the user, educational data, interest data, messages to and from the user, and the like.

In various embodiments, the risk-taker or verification service compares the employer named by the user (user application employer) in step 110, for example, matches or is related to the employer named in the user's social network (user social network employer). As will be described further below, a degree of matching of the user application employer and the user social network employer may be determined, step 190. In various embodiments, a representation for the degree of matching may be generated in the form of a graphical user interface (GUI), step 200, and the GUI may be sent and displayed to the risk taker or the verification service, step 210. In some embodiments, the degree of matching may be returned in an e-mail, text message, graphical user interface, web page, or the like.

Figure 2:
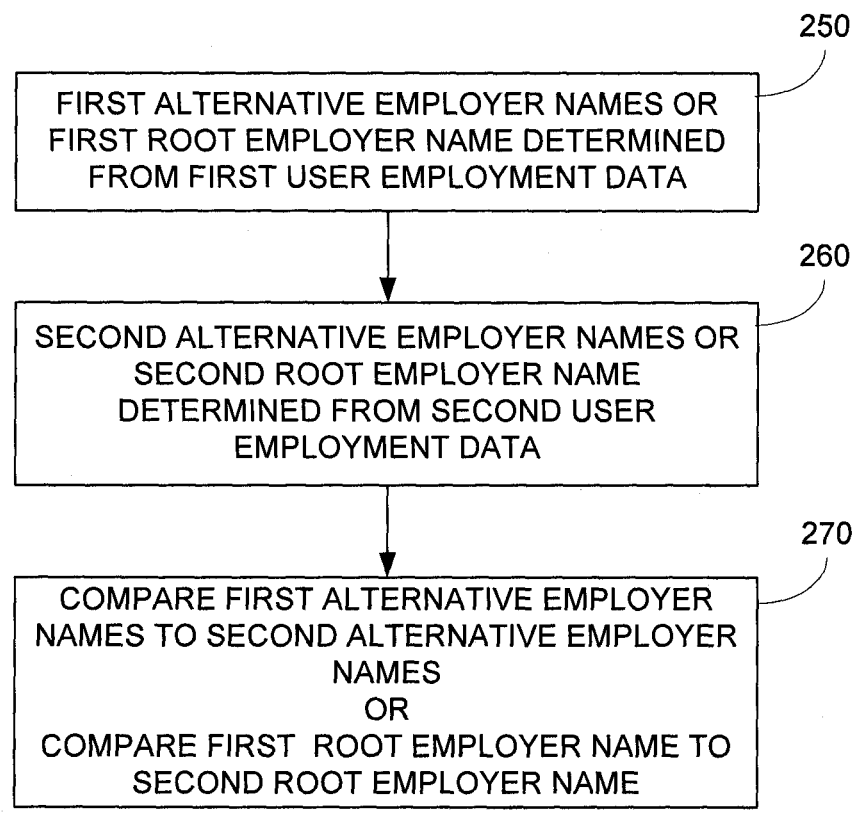
FIG. 2 illustrates a block diagram of a flow chart according to various embodiments of the present invention.

FIG. 2 illustrates a block diagram of a flow chart according to various embodiments of the present invention. More specifically, FIG. 2 illustrates a more detailed flow chart of process for determining a degree of matching in step 190. In various embodiments, the employer name provided by the user in different contexts, e.g. application, social network, etc. may be different, even though they refer to the same employer. Additionally, the name provided may be different from a legal name of the employer, corporate name of the employer, or the like. In various embodiments a fuzzy logic process, or the like may be applied to the user-provided employer names before a degree of matching may be determined.

As examples of the user providing different employer names, in a first social network site, the user may identify her employer as IBM, and in a second social network site, the user may identify her employer as IBM UK; in one social graph, the user may identify his employer as PARC, and in another social graph, it may be Xerox. In embodiments of the present invention, many techniques for correlating user-represented employment data are contemplated. As one example, if the user's work place e-mail is provided, the domain name provided may be checked against a database, or the like, of known domain names of various companies. Using the PARC example, above, a user may be employed for PARC, and have a domain e-mail address of @PARC.com. In such a case, because the database reflects that PARC.com and Xerox.com are owned by the same legal entity, this is a strong indicator that the user-application employer name matches the user social network employer name.

In other embodiments, other types of user-related employment data may need to be normalized. As examples, in one social graph, the user may identify her employer address as Czechoslovakia, and in another social graph the user may identify her employer address as the Czech Republic; in one social graph, the user may identify his supervisor in surname first order, e.g. Lin, Jeremy, and in another social graph, the user may identify his supervisor in given name first order, e.g. Jeremy Lin; and the like. Additionally, in some embodiments, it is recognized that one social graph (e.g. Facebook) and another social graph (e.g. LinkedIn) may return user data in different types and formats of data in response to the same question. For example, one social graph may return employment dates in the form of calendar start and stop dates and another social graph may simply return employment duration, or how long ago the user worked there. As another example, one social graph may separate employment by industry, and another social graph may simply list employment. In light of the above, embodiments of the present invention normalize between types or formats of data provided by social graphs, user-applications, and the like.

In various embodiments, one or more first employer names are determined from the user application employer name, step 250. This may include determining one normalized employer name or a series of alternative employer names. As mentioned above, numerous methods may be used to perform this function. In one example, this may include comparing the user application employer name against a database of corporate names, subsidiaries, joint ventures, and the like. For example, in a database, the user application employer name "PARC" is associated with "Palo Alto Research Center," "Xerox," "Xerox, Inc.," and the like. Accordingly, in some embodiments, "Xerox, Inc." is returned, and in other embodiments, the above list of alternative names is returned.

Additionally, one or more second employer names are determined from the user social network employer name, step 260. This may include determining one normalized employer name or a series of alternative employer names. Numerous methods may be used to perform this function. In one example, this may include comparing the name to a database of corporate name aliases, or the like. For example, in a database the user social network employer "Pixar" is determined to be associated with "Pixar Animation Studios," "Disney," "The Walt Disney Company," and the like. Accordingly, in some embodiments, "The Walt Disney Company" is returned, and in other embodiments, the above list of alternative names is returned.

In various embodiments, the one or more first employer names are compared to the one or more second employer names to determine an overlap, step 270. As an example, if a user application employer name is "Lincoln Labs," the one or more first employer names may include "MIT," "M.I.T.," and "Massachusetts Institute of Technology;" and if a user social network employer name is "MIT Lincoln Labs," the one or more first employer names may include "Lincoln Labs," "MIT", and the like. In such a case, in the present embodiment, because both sets of names include "MIT," for example, the user application employer name may be considered to match the user social network employer name. In various embodiments, an amount of overlap of the first employer names to the second employer names may be used to determine a degree of matching or scoring. In one example, the first employer names is identical to the second employer names, the degree of matching may be high; whereas if only one name out of 10 names from the first employer names matches only one name out of 10 names from the second employer names, the degree of matching may be low.

Figure 3:
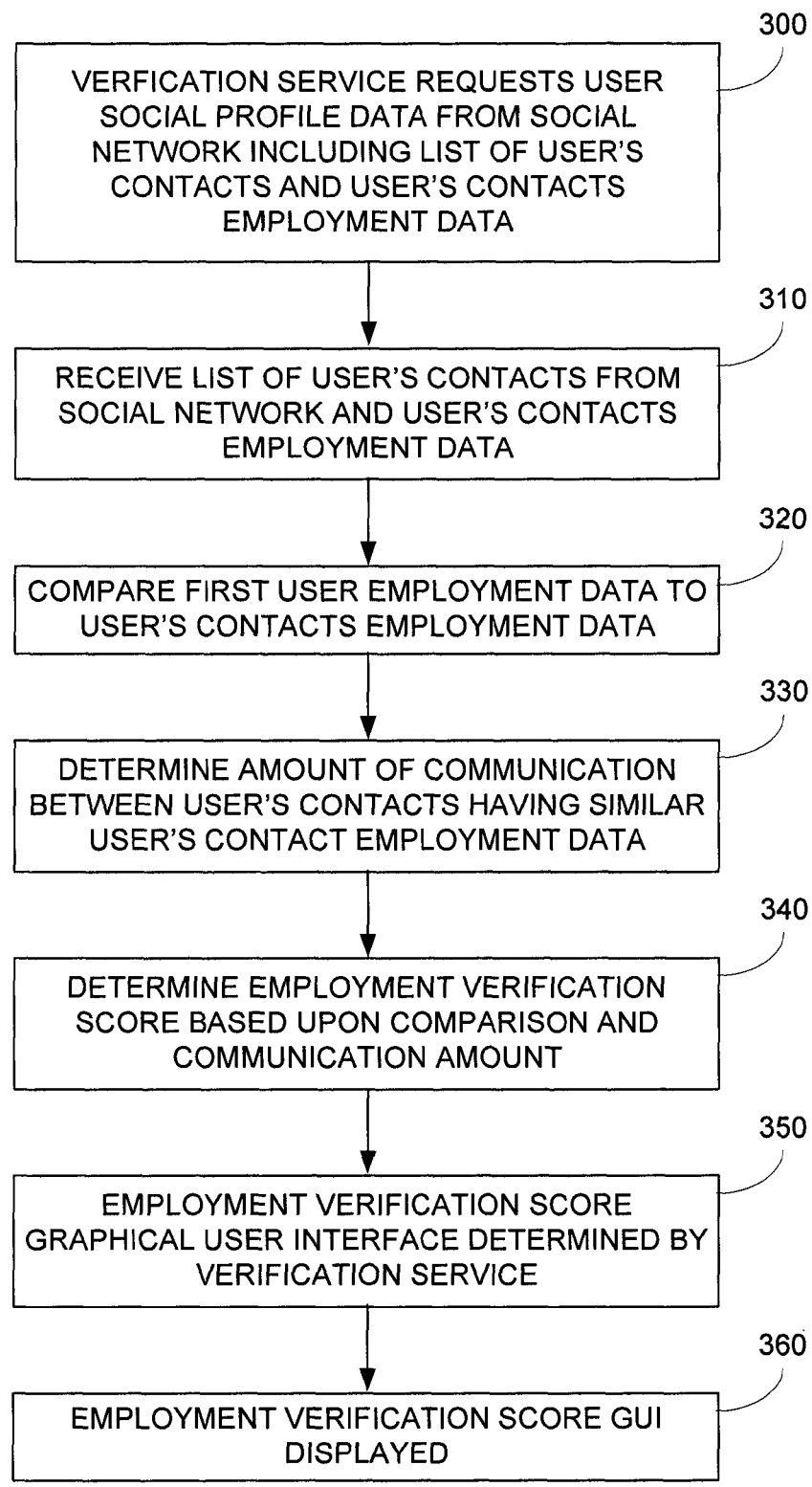
FIG. 3 illustrates a block diagram of a flow chart according to some embodiments of the present invention.

FIG. 3 illustrates a block diagram of a flow chart according to some embodiments of the present invention. More specifically, FIG. 3 illustrates additional processes for determining a degree of matching. In various embodiments, based upon the social graph of the user from the social networks, one or more determinations may be made to see if the user is connected with other persons who work at same employer. It is believed that the larger the number of social contacts, connections, or the like that work at the company the user claims in an application (e.g. user application employer name), the higher the chance that the user actually works there.

In various embodiments, after step 170, in FIG. 1A, the risk taker server, or verification server makes one or more requests to the social network server for employment data for the user's friends from the list of contacts and employment data associated with the user's friends, step 300. In some embodiments, one or more APIs and/or XML calls supported by the social network server may be used to request employment data such as employer name, employment dates, work e-mail address for one or more of the user's friends, or the like. In response the requested list of user contact data and associated employment data is returned, step 310.

In various embodiments, a determination is made as to whether any of the user's friends are employed by the same purported employer of the user, step 310. In some embodiments, similar to the above, the employment data of the user is compared to the employment data of the user's friends, step 320. It is believed that the more friends of the user who work at the same employer stated by user in the application, the higher the certainty that the user actually works at the employer. For example, if five of the user's friends also state that they work at the same employer on their social networks, the degree of matching may be higher than if only one of the user's friend does. In other embodiments, the degree of matching may depend upon a percentage of the user's friends who work at the same employer. As examples, if 10% of the user's friends also state that the work the same employer, the degree of verification is higher than if 1% of the user's friends also state that they work for the same employer.

In some embodiments, for the user's friends who list the same employer, a determination can be made as to the quality (e.g. frequency or amount) of communication among the user's friends, step 330. The more communications between the user and/or between the user's friends have among each other, the higher the degree of matching, in some embodiments. In other embodiments, quality of communication among the user's friends, or between the user's friends and the users may be based upon factors other than frequency or amount, such as, number of wall comments or posts on each other's pages, number of clicks of "like"s on each other's pages, whether the user or other user's appear and are identified in the same pictures or photos, when these communications are made, and the like. The communications between the friends may also be determined via one or more API and/or XML calls to the social network server.

In some embodiments, degrees of additional verification may be performed upon the user's and or the user's friend's social network data. For example, in some embodiments, the work e-mail address of the user of the user's friends' may be provided within the social network. In response, the domain name may be compared to domain names owned by the purported employers, the formatting of the email boxes (e.g. to the left of the domain name), and the like, to determine a match. As examples, Jim@newcompany.com may be a domain owned by New Company, whereas Jim@new-company.com may not be owned by New Company. Accordingly, if a user states in an application that they work for New Company, but provides Jim@new-company.com, embodiments of the present invention may determine that the user does not work for New Company. In various embodiments, an employer name may be checked against a database of US or foreign employers. In addition the employer name may be checked against an e-mail domain name provided by the user as her company e-mail address. In various embodiments, such checking may also help indicate whether the employer/company is valid. More detailed examples of these embodiments are provided below.

In some embodiments, additional types of data may be referenced to determine if a user works at the purported employer, or a degree of matching. For example, publically available data may be cross-referenced or accessed to help indicate whether the user actually works at the employer. As examples, based upon the user entered employment data in an application, the user's salary and position may be cross-referenced against data from sites such as BLS, salary.com, Glassdoor, and the like. In some embodiments, when the data conforms with the position and salary ranges, this may help indicate that the user does actually work for the self-reported company.

In various embodiments, based upon such these and other types of comparisons, the employment verification score may be determined, step 340. The score, underlying data, flagged data, and the like may then be provided in a GUI, step 350, that is displayed to the requester of the employment verification, step 360, as was discussed, above.

In one specific embodiment, the following processes are performed to determine a verification score. In this example, indentations represent an affirmative response:

```
LinkedIn (LI) or Facebook (FB) Connected?
    Employment field present (filled-in by user or selected by drop-down menu)?
        Match to Employer name from form (using fuzzy name correction)?
            Number of Friends that have same employer as form?
                Friend still works there?
                    Contact of some sort made between friend and user (tagged photo, wall post, direct message)?
                        Contact made recently?
                            Increase score
                        Contact made a long time ago?
                            Maintain score
                        No Contact Made?
                            Decrease score
                Friend no longer works there?
                    Contact of some sort made between friend and borrower (tagged photo, wall post, direct message)?
                        Contact made recently?
                            Maintain score
                        Contact made a long time ago?
                            Decrease score
                        No Contact Made?
                            Decrease score
            Friends do not have same employer as form?
                Decrease score
        Not a Match to Employer name from form?
            Friends have same employer as form?
                Friend still works there?
                    Contact of some sort made between friend and borrower (tagged photo, wall post, direct message)?
                        Contact made recently?
                            Maintain or decrease score
                        Contact made a long time ago?
                            Decrease score
                        No Contact Made?
                            Decrease score
                Friend no longer works there?
                    Contact of some sort made between friend and borrower (tagged photo, wall post, direct message)?
                        Contact made recently?
                            Maintain score
```

-continued

```
                            Contact made a long time ago
                                Decrease score
                            No Contact Made
                                Decrease score
                        Friends do not have same employer as form?
                            Decrease score
                    Friends have same employer as in Facebook?
                        Friend still works there?
                            Contact of some sort made between friend and
borrower (tagged photo, wall post, direct message)?
                                Contact made recently?
                                    Increase score
                                Contact made a long time ago?
                                    Maintain score
                            No Contact Made?
                                Decrease score
                        Friend no longer works there?
                            Contact of some sort made between friend and
borrower (tagged photo, wall post, direct message)?
                                Contact made recently?
                                    Maintain score
                                Contact made a long time ago
                                    Decrease score
                            No Contact Made
                                Decrease score
                    Friends do not have same employer as in Facebook?
                        Decrease score
```

In the above embodiments, the increase, decrease or maintaining of verification scores may be modified, based upon ordinary design choices in light of the present invention disclosure. Further, the weightings of any increases or decreases may also vary based upon the same design choices.

In some embodiments, the verification (validation) may also be performed on publically-available data (e.g. not requiring OAuth, or equivalent). In such embodiments, the risk taker or verification service may receive user input data (e.g. form submission, or the like), and compare such data against a publically-available or pay-based data sources (e.g. Spokeo, or the like).

Employment Verification Concept—Corporate E-mail Verification of User Represented Employer In various embodiments, positive actions may be required of the user to help the risk taker or verification service verify that the user works for the user-reported employer (e.g. user application employment name). One embodiment involves sending an e-mail message to the work e-mail address the user provides during the application process and verifying the user has access to that email address. Such embodiments take into account that usually only current employees are given an active email addresses by their employers. When an employee is no long employed, employers typically cut off user access to these email accounts immediately.

Figure 4A:
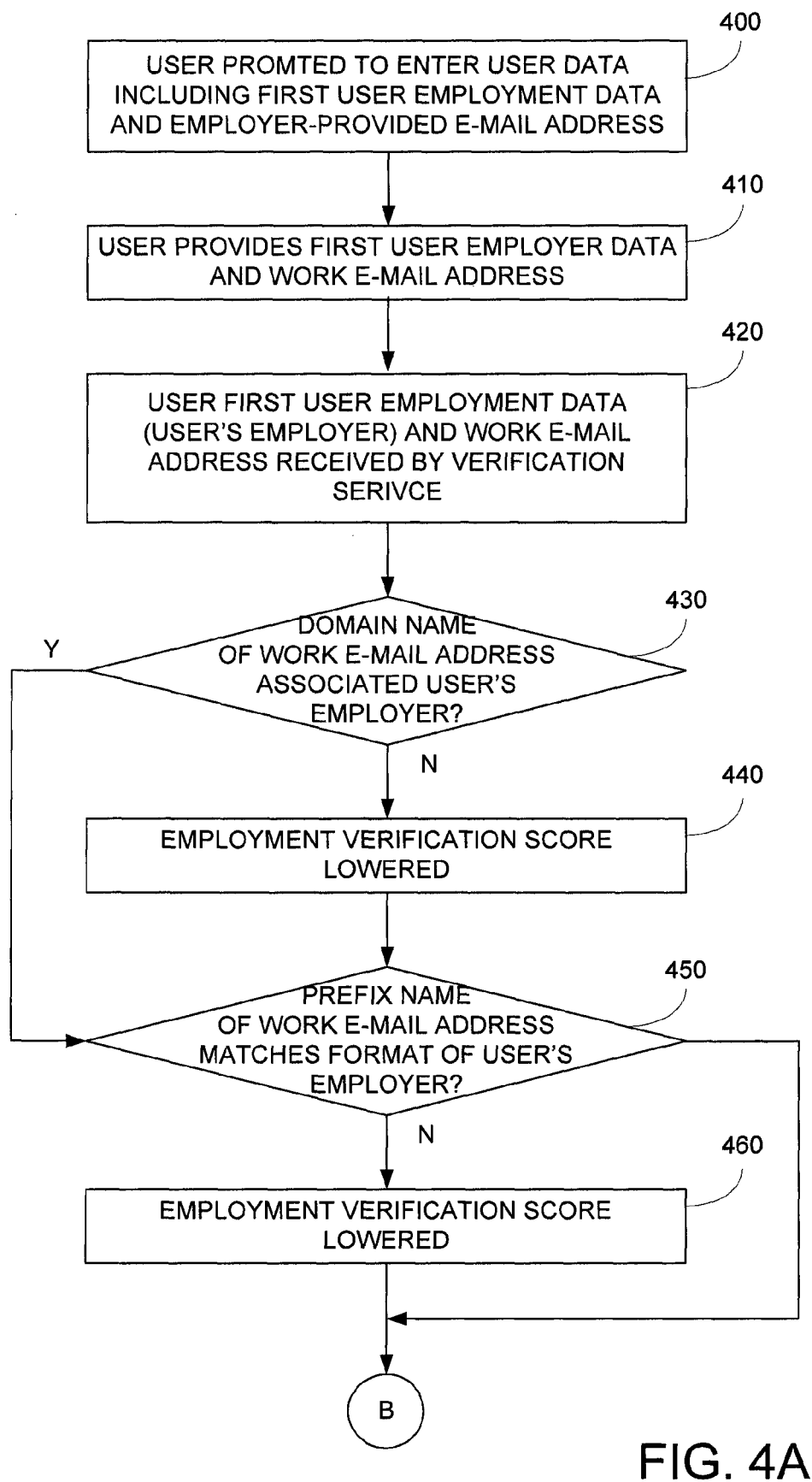
FIGS. 4A-C illustrate a block diagram of a process according to various embodiments of the present invention.
Figure 4B:
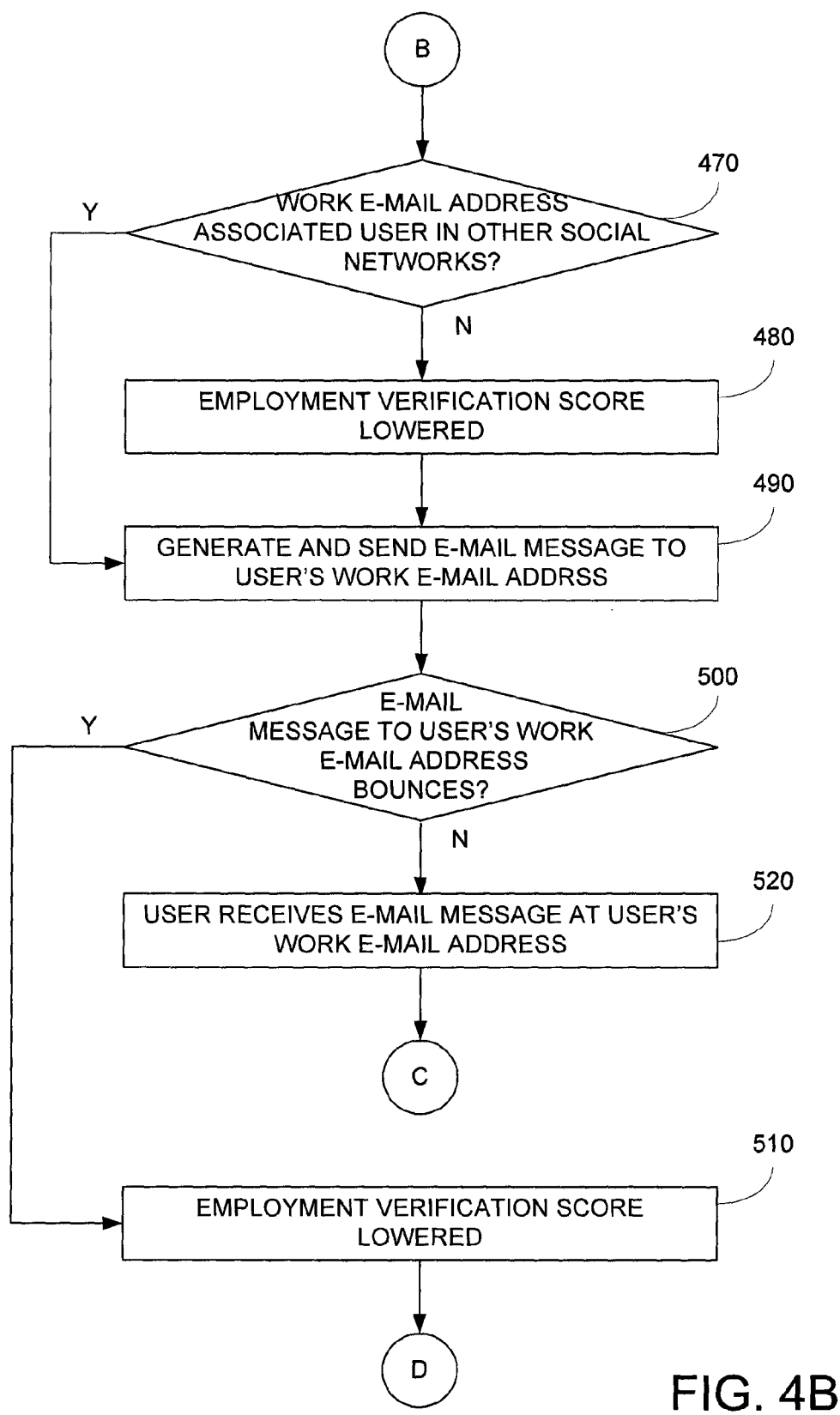
Figure 4C:
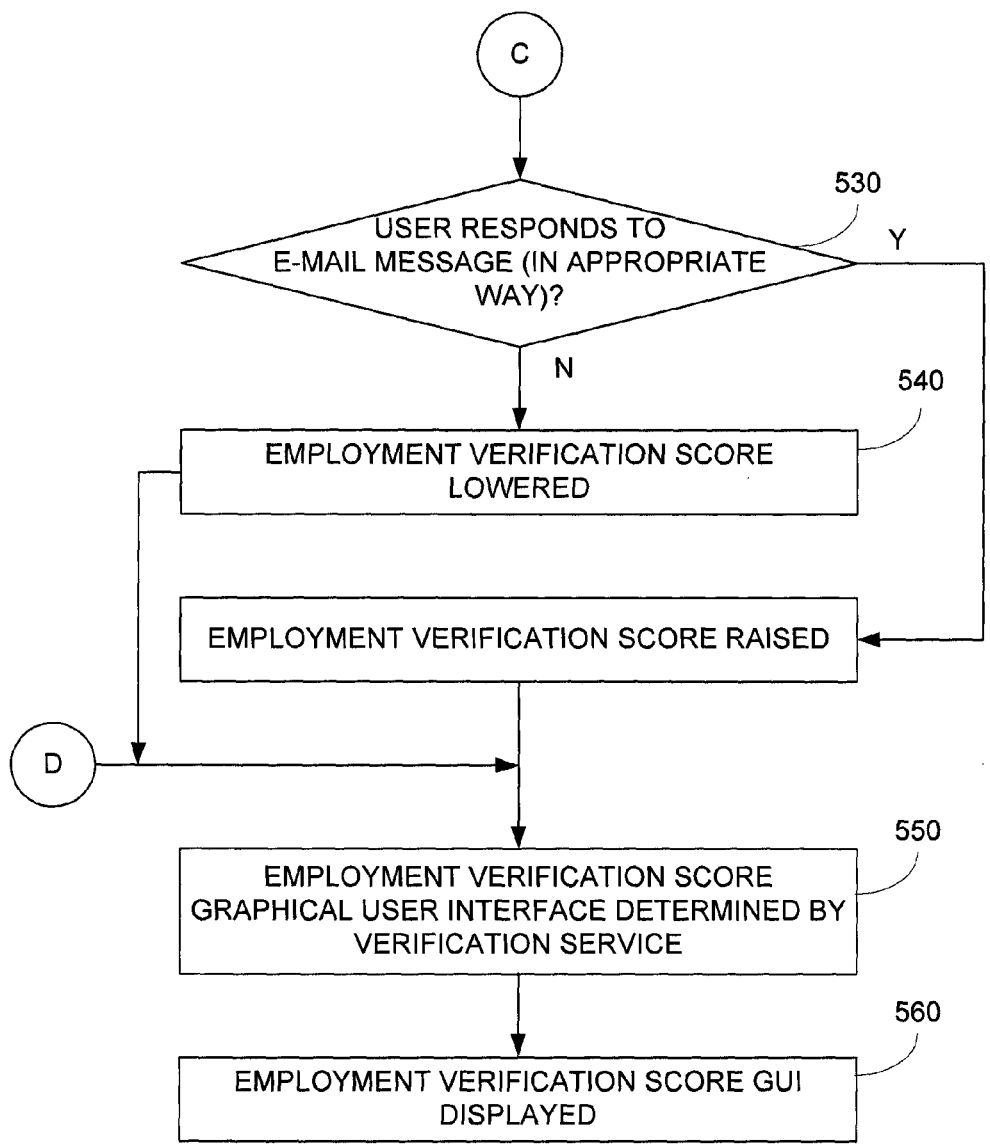

FIGS. 4A-C illustrates a block diagram of a process according to various embodiments of the present invention. In various embodiments, a user is prompted to fill in a user-application for a risk-taker in the context of an on-line web-site associated with a risk taker or a verification service, step 400. In other embodiments, the user may be prompted to enter data in a portable device application (e.g. Android app, iPhone app) provided by the risk taker or verification service. In still other embodiments, the user may be given a paper application by such parties.

In response, the user fills-in the user application, step 410. In various embodiments, the user may use a keyboard to enter user-application data electronically through a web-form submission, an application on a device (e.g. phone, tablet), a kiosk, or the like. In other embodiments, the user may write answers on paper, and the like. In typical applications, the user may make representations about themselves, such as their current employer, current position, current salary, length of time at the employer, address, educational accomplishments, and the like.

In some embodiments, the user-application data is received by a risk-taker or verification service, step 420. In some embodiments, the user specifies a user-provided employer name, and a work-email address (e.g. e-mail address provided by the employer).

Next, in some embodiments, the risk taker or verification server pings a database of existing company email domains and compares that the domain (right of the @ symbol) of the user-provided email address to a database of corporate-owned domain names, step 430. In various embodiments, if user-provided domain name does not match a domain name owned by the user-provided employer name, the verification score may be lowered, step 440. In various embodiments, other types of employment verification may be performed.

In various embodiments, the risk taker or verification server pings the database of existing company email prefix formats with respect to the email prefix of the user-provided email address, step 450. In various embodiments, if user-provided email prefix does not match a prefix template associated with the employer, the verification score may be lowered, step 460. In various embodiments, other types of verification may also be performed.

As an example of e-mail prefix comparison, the following steps may be performed:

1) Determine what the user's provided corporate email prefix address is in, e.g.: userfirstname.borrowerlastname@employer.com, user-firstname_user-lastname@employer.com, user-firstinitial.user-lastname@employer.com, etc.

2) Check if the user-provided work email prefix address has a prefix format that matches the prefix format for that employer (based on a database of known prefix formats for different employers). For example at Employer One, if the email address for an employee is in the format: user-firstname-e.user-lastname@employerone.com, a user named John Doe's who works for Employer One would ideally be John.Doe@employerone.com. Accordingly, if a user named "John Doe" provides their work e-mail address as J.Doe@employerone.com, the risk taker or verification server may not believe that John Doe works at Employer One. In cases where the user-provided prefix matches the corporate email prefix format, the verification score may be raised.

In additional embodiments, the user provided email address may be used for additional verification steps, step 470. For example, the user provided email address may be compared to a social media network to see if there is a mapping between the user provided email address and the user. For example, if John.doe@employerone.com maps to the user on LinkedIn.com and Plaxo, the chance of John Doe working at Employer One is higher than if the user provided email address is not associated with anyone on LinkedIn, Facebook, Plaxo, Google+, or the like. If not, the verification score may be lowered, step 480.

In some embodiments of the present invention, an e-mail may be generated, step 490 and sent to the user-provided work e-mail address, step 500. In various embodiments, the email message includes an alphanumeric code, token password, input request, URL, instructions for the user, or the like. If the e-mail message bounces, i.e. the employer server does not recognize the prefix, the domain name is invalid, an inactive account notice is returned, or the like, step 500, the verification score may be lowered, step 510.

In various embodiments, the user receives the e-mail message at the user's work e-mail address, step 520. In various embodiments, the user may respond to the mail via a popup window from the e-mail message; via a reply e-mail, a new e-mail message, attach a photo, or the like, step 530. By requiring a response from the user, the risk taker or verification server receives confirmation that the user-provided e-mail address is a valid email address. In some embodiments, the e-mail message includes a link that the user must click to reply. In some embodiments, the environment (e.g. browser, IP, GPS coordinates) of that click can be saved and forwarded back to the employment verification organization. If the user does not respond, gives an incomplete response, or does not respond in the appropriate manner, the employment verification score may be lowered, step 540.

In some embodiments, the required user response may be calling a specific telephone number, and performing an action. Examples of actions may include speaking a message, entering a numeric token provided by the e-mail message, receiving a specific numeric token, performing a calculation (e.g. adding two numbers), responding to a captcha image, providing data requested (e.g. Mother's maiden name), or the like. In various embodiments, when the user calls-in, the telephone number that the user is using may also be used for determining the verification score. For example, based upon caller-id, C-name record, CID, CLID, or the like, the telephone number is recorded, and that telephone number is compared to a database of telephone numbers owned by specific employers. Accordingly, if a user states she works for HP, and the telephone number she calls from is owned by HP, the probability the user works for HP is higher.

In various embodiments, to reduce the chance of a user (who does not work for the company) is not using a friend's e-mail account (who works at the company) for verification purposes, the e-mail recipient may be put on notice that if the recipient is not the user, the recipient is financially vouching for (e.g. guaranteeing) the financial risk (e.g. loan, lease, etc.).

Next, in various embodiments, the employment verification score GUI may be determined, as discussed above, step 550, and the GUI may be returned to the risk taker or the verification service, step 560. In some embodiments, the degree of matching may be returned in an e-mail, text message, graphical user interface, web page, or the like.

In alternative embodiments of the present invention, the user is requested to send an e-mail to a specific e-mail address associated with the risk taker or the verification server, as an initial step. As an example, a common address for the email from the user to be sent to may be: borrower@loanpayer.com or borrower+33323@loanpayers.com, or the like. In such embodiments, the user will send an email message to this account from their corporate/work e-mail account.

In various embodiments, verification processes may also be performed, as described above, to determine the verification score, such as the domain name, the prefix, the FROM fields (see RFC 822), the Return-Path, IP address(es) and the like. Additional e-mail fields upon which analysis may be performed are also contemplated.

Types of claims envisioned covering the above embodiments may include employment verification via sending or receiving e-mail to/from a user:

1. A computer-implemented method for verifying employment of a user with a computer system programmed to perform the method comprising:

receiving with the computer system, an organization represented by the user as an employer on a user-application;

receiving with the computer system, an e-mail address provided by the user, wherein the e-mail address is represented by the user as an e-mail address of the user at the employer;

determining with the computer system, whether the e-mail address provided by the user is associated with the employer;

determining with the computer system, an association indicator associated with the user in response to the domain name and/or prefix of the e-mail address provided by the user being determined to be associated with the employer;

determining with the computer system an employment verification indicator associated with the user in response to the association indicator; and outputting with the computer system the employment verification indicator.

The user initiating the e-mail process:

2. The method of claim 1 wherein receiving with the computer system, the e-mail address provided by the user, comprises receiving an e-mail message from the user from the e-mail address.

The verification server initiating the e-mail process:

3. The method of claim 1 further comprising:

determining with the computer system, a required action for the user;

sending with the computer system, an e-mail message to the e-mail address including the required action for the user; thereafter receiving with the computer system, an action indicator indicating that the user has performed the required action; and wherein determining with the computer system the employment verification indicator associated with the user is also in response to the action indicator;

Response message includes a token or indicator:

4. The method of claim 3 wherein the receiving with the computer system, the action indicator indicting that the user performed the required action comprises receiving with the computer system, a message from the user selected from a group consisting of: a reply e-mail message, an e-mail message, a text message, a SMS, a web form submission.

Types of actions the user performs to prove the received the e-mail message:

5. The method of claim 3 wherein the receiving with the computer system, the action indicator indicating that the user performed the required action comprises receiving data selected from a group consisting of: a textual message, a web form submission, a code, a pre-determined output message, a portion of a pre-determined output message, a picture, a screen shot, a spoken message, a response, or GPS coordinates.

Clicking upon a web link:

6. The method of claim 3 wherein the required action is associated with a user-selectable web link; and wherein the receiving with the computer system, the indicator indicting that the user performed the required action comprises receiving with the computer system, an indication that the user clicked upon the user-selectable web link.

Matching domain names:

7. The method of claim 1 wherein the determining with the computer system, whether the e-mail address provided by the user is associated with the employer comprises determining whether a portion of the domain name is associated with the employer, wherein the portion is selected from a group consisting of: top-level domain name, second-level domain name, third-level domain name.

Matching multiple domain names:

8. The method of claim 6 wherein the determining with the computer system, whether the e-mail address provided by the user is associated with the employer comprises determining whether the top-level domain name, the second-level domain name, and the third-level domain name are all associated with the employer.

Matching domain names:

9. The method of claim 6 wherein the determining with the computer system, whether the e-mail address provided by the user is associated with the employer comprises comparing the domain name to a database of domain names associated with the employer.

Expected user name prefixes matches:

10. The method of claim 1 wherein the determining with the computer system, whether the e-mail address provided by the user is associated with the employer comprises determining whether a prefix of the e-mail address provided by the user matches a prefix template associated with the employer.

An example of matching prefixes:

12. The method of claim 11 wherein the prefix template associated with the employer includes a first name indicator and a last name indicator, wherein the first name indicator is selected from a group consisting of: a first name initial, a full first name; and wherein the last name indicator is selected from a group consisting of: a last name initial, a full last name.

Requesting the user application:

13. The method of claim 1 further comprising sending a web-form requesting the first user to provide a name of the employer of the first user and the e-mail address of the user at the employer.

Verifying the e-mail address is properly formatted, prior to sending:

/e-mail must verify before an e-mail is sent/

14. The method of claim 3 wherein sending with the computer system, the e-mail message to the e-mail address including the required action for the user comprises: sending with the computer system, the e-mail message to the e-mail address only when the e-mail address provided by the user is determined to be associated with the employer.

Locations for the code or token in the e-mail message:

15. The method of claim 3 wherein the e-mail message includes a code on a subject line of the e-mail message; and wherein the receiving with the computer system, the action indicator indicating that the user performed the required action comprises receiving the code from the user.

Types of tall-through verifications:

16. The method of claim 1 wherein when the e-mail address provided by the user is not determined to be associated with the employer, the method comprises a step selected from a group consisting of:

determining user-identified employment data from a social profile of the user in one or more social networks;

determining with the computer system, an IP address associated with the user;

determining and outputting with the computer system, a telephone number associated with the organization to a call center;

initiating with the computer system, a public search on one or more publically available databases for information associated with the first user;

initiating with computer system, a request to the user for a copy of income verification records;

determining with the computer system, an organization associated with a domain name of an e-mail address provided by the first user;

determining with the computer system, an organization associated with a telephone number provided by the first user;

determining with the computer system, an organization associated with employer direct deposits into a financial account of the first user; and determining with the computer system, a organization associated with user tax-related documentation.

A enabling hardware system:

17. A computer system coupled for verifying employment of a first user with a computer system programmed to perform the method comprising:

a memory configured to store an organization represented by the user as an employer on a user-application; and a processor coupled to the memory, wherein the processor is instructed by executable software code to receive an e-mail address provided by the user, wherein the e-mail address is represented by the user as an e-mail address of the user at the employer;

wherein the processor is instructed by executable software code to determine whether the e-mail address provided by the user is associated with the employer;

wherein the processor is instructed by executable software code to determine an association indicator associated with the user in response to the domain name of the e-mail address provided by the user being determined to be associated with the employer;

wherein the processor is instructed by executable software code to determine an employment verification indicator associated with the user in response to the association indicator; and wherein the processor is instructed by executable software code to output the employment verification indicator to a remote server.

User initiates e-mail verification:

18. The computer system of claim 17 wherein the processor is instructed by executable software code to receive with the computer system, the e-mail address from an e-mail message provided by the user.

Server initiates e-mail verification:

19. The computer system of claim 17 wherein the processor is instructed by executable software code to determine a required action for the user;

wherein the processor is instructed by executable software code to send an e-mail message to the e-mail address including the required action for the user;

wherein the processor is instructed by executable software code to receive an action indicator indicating that the user has performed the required action; and wherein the processor is instructed by executable software code to determine the employment verification indicator associated with the user in response to the association indicator and in response to the action indicator.

Server receives initial e-mail message:

20. The computer system of claim 19 wherein the required action comprises receiving with the computer system, a message from the user selected from a group consisting of: a reply e-mail message, an e-mail message, a text message, a SMS, a web form submission.

Additional types of claims envisioned covering the above embodiments may include employment verification via sending or receiving e-mail to/from a user. Receiving a confirmation message from the user's work e-mail address:

1. A computer-implemented method for verifying employment of a user with a computer system programmed to perform the method comprising:

receiving with the computer system, an organization represented by the user as an employer on a user-application;

receiving with the computer system, an e-mail message from the user from a user email address;

determining with the computer system, whether the user email address is associated with the employer;

determining with the computer system, an association indicator associated with the user when the user email address is determined to be associated with the employer;

determining with the computer system an employment verification indicator associated with the user in response to the association indicator; and outputting with the computer system the employment verification indicator.

Do portions of domain names match:

2. The method of claim 1 wherein the determining with the computer system whether the e-mail address is associated with the employer comprises determining whether a portion of the domain name is associated with the employer, wherein the portion is selected from a group consisting of: top-level domain name, second-level domain name, third-level domain name.

Do multiple portions of the domain names match:

3. The method of claim 1 wherein the determining with the computer system, whether the e-mail address is associated with the employer comprises determining whether the top-level domain name, the second-level domain name, and the third-level domain name are all associated with the employer.

Database of domain names:

4. The method of claim 1 wherein the determining with the computer system, whether the e-mail address is associated with the employer comprises comparing with the computer system, a domain name of the e-mail address to a database of domain names associated with the employer.

Expected e-mail address prefixes match:

5. The method of claim 1 wherein the determining with the computer system, whether the e-mail address is associated with the employer comprises determining whether a prefix of the e-mail address matches a prefix template associated with the employer.

Examples of prefixes match:

6. The method of claim 5
wherein the prefix template associated with the employer includes a first name indicator and a last name indicator,
wherein the first name indicator is selected from a group consisting of: a first name initial, a full first name; and
wherein the last name indicator is selected from a group consisting of: a last name initial, a full last name.

What else does the e-mail contain:

7. The method of claim 6 wherein the e-mail message includes data selected from a group consisting of: a textual message, a pre-determined output message, a portion of a pre-determined output message, a picture, a screen shot, a spoken message, a response, GPS coordinates.

Where is the e-mail address found:

8. The method of claim 1
wherein the e-mail message comprises a plurality of header data;
wherein the user email address is stored in a portion of the plurality of header data; and
wherein the portion is selected from a group consisting of: a from field, a reply-to field.

Fall-through processes for verification:

9. The method of claim 1
wherein when the e-mail address provided by the user is not determined to be associated with the employer, the method comprises:
determining user-identified employment data within a social profile of the user in one or more social networks.

Requesting the e-mail:

10. The method of claim 1 further comprising:
sending with the computer system to the user a request that the user send the e-mail message from the user e-mail address to a pre-determined e-mail address; and
wherein receiving with the computer system, the e-mail message from the user from the user email address comprises receiving with the computer system, the e-mail message in an inbox associated with the pre-determined e-mail address.

In other embodiments, an e-mail message need not be sent to the user-provided e-mail address for the employment verification process. In such cases, based upon the user name, and employer name, the verification server may determine an expected user e-mail address. In various embodiments, using the employer name, a database of employer e-mail domain names may be referenced, to determine the expected employer e-mail domain name. For example, if a user is a employee of Google, Inc., the expected employer e-mail domain name is not "gmail.com," but "Google.com." Next, the expected prefix (in front of the @ symbol) may be determined using the employee name and a database of employer name formats. For example, for company A, for a user named "John Smith" the format may be "john.smith," whereas for company B, the format may be "john_smith," or the like. Together the expected prefix and expected domain name are combined to form an expected e-mail address for the user at the company.

In various embodiments, instead of sending an e-mail message to the expected e-mail address, as discussed above, the expected e-mail address may be sent to an e-mail server associated with the expected domain name. In response, the e-mail server may accept or reject message. A rejection message may indicate that the user does not actually work at the employer, and an acceptance may indicate that the user does actually work at the employer. In various embodiments, the verification server, or the like sends the expected e-mail address of the user to the mail server via port 25, 587, or any other port that supports this functionality.

In some cases, an acceptance of an expected e-mail address of the user may not indicate that the user works at the employer, if the e-mail server also accepts obviously invalid e-mail addresses. For example, if smith.john@google.com is accepted by the e-mail server, and 2342341fjadoifeioruqewoiruwpeafadnzm.cxvnzdsfjoj24j23423489oijfas@google.com is also accepted by the e-mail server, this process does not validate the expected e-mail address of the user at the company. Accordingly, in some embodiments, an actual e-mail message may have to be sent including a token, or the like, as discussed above.

Types of claims envisioned covering the above embodiments may include determining whether an expected e-mail address will bounce:

1. A computer-implemented method for determining in near real-time an employment verification score on a computer system programmed to perform the method, comprising:

receiving in the computer system, a name of an individual;

receiving in the computer system, an employer name, wherein the employer name is provided by the individual and is represented by the individual as an employer of the individual;

determining in the computer system, at least one e-mail domain names associated with the employer in response to the employer name;

determining in the computer system, at least one expected user names associated with the individual, in response to the employer name and in response to the name of the individual;

determining in the computer system, at least one expected e-mail address associated with the individual in response to the e-mail domain name and the expected user name;

sending from the computer system, the expected e-mail address associated with the individual to an e-mail server associated with the e-mail domain name;

determining in the computer system, whether the expected e-mail address associated with the individual is rejected from the e-mail server; and outputting from the computer system, an employment verification score associated with the individual in response to whether the expected e-mail address associated with the individual is rejected.

Performing a look up for a corporate e-mail domain name in a database:

2. The method of claim 1 wherein the determining in the computer system, the e-mail domain name comprises determining from an e-mail domain name data structure referenced by the computer system, an e-mail domain name associated with the employer in response to the employer name.

The database may be a remote database:

3. The method of claim 2 wherein the data structure comprise an e-mail domain name data structure stored in a server remote from the computer system.

Performing a look up for a corporate e-mail domain name in a search engine:

4. The method of claim 1 wherein the determining in the computer system, the e-mail domain name comprises outputting by the computer system, a query to a search engine.

Guessing the user name based upon a template of the employer (based upon database or search):

5. The method of claim 1 wherein the determining in the computer system, the expected user name associated with the individual comprises:

determining with the computer system, a user name template associated with the employer in response to the employer name; and determining with the computer system, the expected user name associated with the individual in response to the user name template associated with the employer and to the name of the individual.

Types of expected e-mail name guessing:

6. The method of claim 1 wherein the expected user name comprises a permutation of data selected from a group consisting of: a first name of the user, a second name of the user, a middle name of the user, a initial of a first name of the user, an initial of a second name of the user, an initial of a middle name of the user, a period symbol, an underscore symbol, a number.

Examples of guessed or expected e-mail names:

7. The method of claim 1 wherein the name of the individual comprises a first name and a second name; and wherein the an expected user name comprises a string of characters selected from a group consisting of: the first name and the second name; an initial of the first name and the second name; the first name and an initial of the second name; the first name, a character, and the last name.

Finding out the address of the corporate e-mail server:

8. The method of claim 1 further comprising determining in the computer system, an IP address associated with the e-mail server in response to the employer name.

Sending a ping to the corporate e-mail server (e.g. Port 25 . . . ):

9. The method of claim 1 wherein sending from the computer system, the expected e-mail address comprises sending from the computer system, the expected e-mail address associated with the individual to the email receiving port of the e-mail server.

Quickly performing these types of lookups in near real time. Payment can vary:

10. The method of claim 1 wherein the method further comprises:

receiving in the computer system, an option to purchase a sales lead from a third party, wherein the sales lead comprises the name of the individual and the employer name, and wherein the option is valid for a limited time period;

accepting in the computer system, the option to purchase the sales lead from the third party when the employment verification score is above a threshold, within the limited time period after receiving the option to purchase the sales lead.

Determining whether clearly invalid e-mail address are also accepted or not:

11. The method of claim 1 wherein the determining in the computer system, whether the expected e-mail address associated with the individual is rejected comprises:

determining in the computer system, whether the expected e-mail address associated with the individual is rejected from the e-mail server;

sending from the computer system, a suspected invalid e-mail address to the e-mail server associated with the e-mail domain name;

determining in the computer system, whether the suspected invalid e-mail address is not rejected from the e-mail server; and determining in the computer system, whether the expected e-mail address associated with the individual is rejected by determining with the computer system, when the expected e-mail address is rejected or when the invalid e-mail address is not rejected from the e-mail server.

In some embodiments, if the suspected invalid e-mail address is accepted by the e-mail server associated with the e-mail domain name, the employment verification score may or may not change.

Figures 5C, 6A:
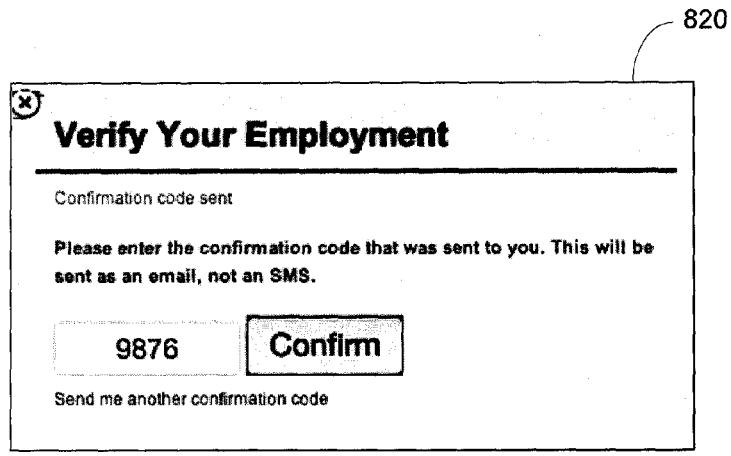

FIGS. 5A-C illustrate graphical user interfaces (GUIs) according to various embodiments of the present invention. More specifically, FIG. 5A illustrates a GUI 830. As can be seen, GUI 830 prompts the user to fill-in a number of user specific data, 840. In addition, in this example, GUI 830 also enables the user to verify themselves on a social network via icons 850. In some other embodiments, icons 850 may not be displayed.

As seen in FIG. 5B a pop-up window 800 can be displayed on top on an on-line application window 810. In various embodiments, pop-up window 800 prompts a user for a work e-mail address. In some embodiments, when the user provides the work e-mail address, an e-mail message may be sent to the user for verification purposes.

FIG. 5C illustrates an example of a GUI window 820 that prompts the user to enter a token (e.g. number, code, etc.) that they received on their provided e-mail address. In various embodiments, if the code entered by the user matches the one sent, for example, the e-mail address may be verified.

Figures 6B, 6C:
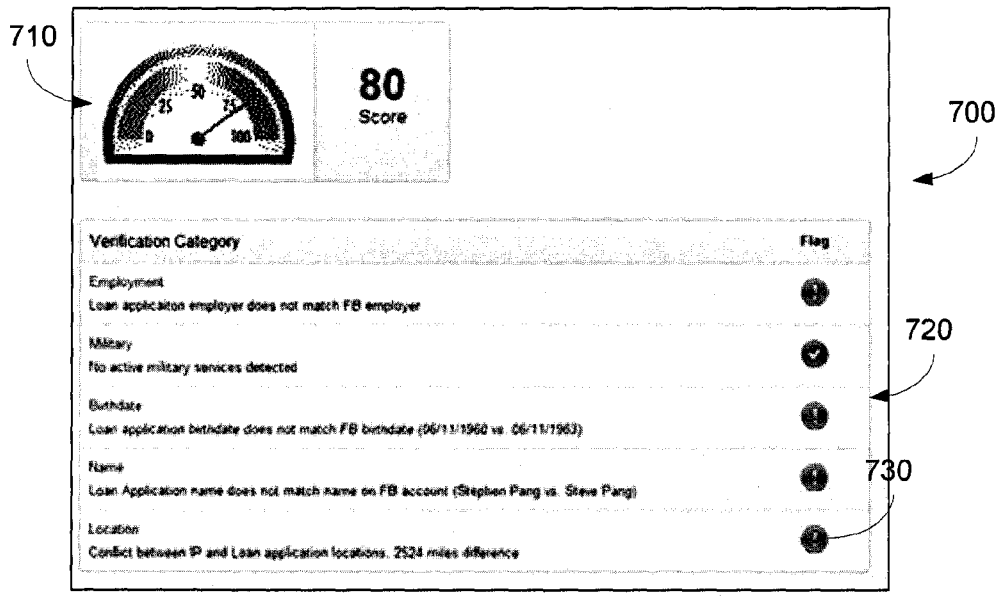

FIGS. 6A-C illustrate graphical user interfaces (GUI) according to various embodiments of the present invention. More specifically, FIG. 6A illustrates a first GUI 600 outputting employment verification scores 610 and associated data to a reviewer associated with a risk taker or verification service. In various embodiments, this GUI provides dashboard-type functionality to a reviewer. With the dashboard interface, if the reviewer would like to review areas 620 which helped increase or decrease the verification score, in various embodiments, the reviewer may simply click upon the desired entry. Additionally, employment verification data derived from various data sources 620, e.g. social networks, may also be illustrated to the reviewer. In the embodiment illustrated in FIG. 6A, e-mail verification results, described in FIG. 4, may also be provided 630 to the reviewer. In various embodiments, employment verification may be binary (e.g. verified or not), or, as illustrated in FIG. 6A, employment verification may have a scored range, 640.

In other embodiments of GUI 600, other types data may also be displayed to the reviewer, such as news articles about the employer (user-represented employer) or the employer's industry, search engine search results regarding the employer, names of other people who represent they work at the employer, names user's friends who work at the employer, a percentage of user's friends who work at the employer, and the like.

FIG. 6B illustrates a second GUI 700 that may be returned to a reviewer at a risk taker or a verification service. In this embodiment, a graphical representation 710 of an employment verification score may be provided. Also, flags 720 that lower an employment score may be illustrated to the reviewer. In such embodiments, a reviewer may click upon the one or more flags 720 to review the user-entered data, the social network data, or the like that causes the flag.

In other embodiments, many other problems or flags may be raised based upon the various verification schemes described herein. For example, as illustrated in flag 730, an IP conflict is raised to the reviewer. As described below, such a flag may be raised if the IP address of the user, when the user fills-in the application does not match the IP address of the employer, or the like. Of course, a discrepancy in IP address may be due to the user filling-in an on-line application while on vacation, and on non-company time. In such a case, a reviewer of this IP address problem may simply review the data, and reject any modification of the employment verification score.

FIG. 6C illustrates an example of a GUI window 740 that may be displayed to a risk taker or a verification service. This embodiment illustrates data retrieved from a user's social network, more specifically social contacts (e.g. friends) who report working at the same employer as the user. As discussed above, the larger the number of social contacts that report working at the same employer, the higher the probability that the user actually works there. Further, in other embodiments, the quantity, quality, and/or frequency of contact with these social contacts may also reflect upon the probability that the user works at the purported employer.

Employment Verification Concept—IP Address and Phone-Based Verification of User Represented Employer In some embodiments, another source of data that may be used to verify an employer may be via an IP address of the user. Typically, an IP address and/or ranges of IP addresses associated with a specific employer or organization. Accordingly, in some embodiments of the present invention, when the user fills-in an on-line application, the IP address of the user's machine may be determined. By using a reverse DNS lookup, or the like, a DNS-derived corporate name/employer may be determined based upon the IP address. In some embodiments, a database of such correspondences is accessed. In various embodiments, the DNS-derived employer name may be compared to any other source of employer name described herein to determine the verification score.

In other embodiments, the IP address may be correlated to a physical geographic region. That geographic region may be compared to physical geographic regions associated with the employer. Using such embodiments, if the employer name provided by an applicant is Stanford Hospital in California, but the IP address the applicant is sending an application from is in the Philippines, the likelihood that the applicant actually works at Stanford may be lower.

In embodiments, another source of data that may be used to verify an employer may be via a user-provided work telephone number. Similar to above, associations between telephone numbers and a specific employer or an organization may be known. Accordingly, in the application the user-provided telephone number may be compared to a database of telephone numbers owned by specific companies or organizations. For example, if a user-provided telephone number is associated with Facebook, but if the user application states she works for Google, the probability the user works for Google decreases.

In other embodiments, the telephone number may be correlated to a physical geographic region. That geographic region may be compared to physical geographic regions associated with the employer. Using such embodiments, if the employer name provided by an applicant is the City of Chicago, but the telephone number the applicant is providing in the application is from India, the likelihood that the applicant actually works for the City of Chicago may be lower.

Combinations of the above are also envisioned in various embodiments, for example, comparing the physical address of an IP address to the physical address of a provided telephone number. Types of claims envisioned may include:

1. A computer-implemented method for determining in near real-time an employment verification score on a computer system programmed to perform the method, comprising:

receiving in the computer system, a name of an individual;

receiving in the computer system, an employer name, wherein the employer name is provided by the individual and is represented by the individual as an employer of the individual;

determining in the computer system, an IP address associated with the employer name;

determining in the computer system, a first geographic region associated with the IP address;

receiving in the computer system, a work telephone number, wherein the work telephone number is provided by the individual and is represented by the individual as a telephone number associated with the individual at a workplace associated with an employer of the individual;

determining in the computer system, a second geographic region associated with the work telephone number; and outputting from the computer system, an employment verification score associated with the individual in response to the first geographic region and the second geographic regions.

Determining a scoring:

2. The method of claim 1 wherein the employment verification score associated with the individual is higher when the first geographic region and the second geographic region overlap than when the first geographic region and the second geographic region do not overlap.

Determining a geographic location:

3. The method of claim 1 wherein the determining in the computer system, a first geographic region associated with the IP address comprises determining in the computer system, a longitude and latitude associated with the IP address.

Determining a geographic location given an IP address:

4. The method of claim 1 wherein the determining in the computer system, the second geographic region associated with the work telephone number comprises determining in the computer system, a longitude and latitude associated with the work telephone number.

Determining whether the phone number is unreliable:

5. The method of claim 1 further comprising:

determining in the computer system whether the work telephone number is associated with a cellular telephone number or a voice over IP telephone number; and reducing the employment verification score when the work telephone number is determined to be associated with a cellular telephone number or a voice over IP telephone number.

Using publically available search engines:

6. The method of claim 1 further comprising:

outputting from the computer system, the employer name to a query engine;

receiving in the computer system, search results from the query engine;

determining in the computer system, whether the search results do not indicate existence of an employment entity associated with the employer name reducing the employment verification score when the search results are determined to not indicate existence of the employment entity associated with the employer name.

Near real time responses:

7. The method of claim 1 wherein the method further comprises:

receiving in the computer system, an option to purchase a sales lead from a third party, wherein the sales lead comprises the name of the individual and the employer name, and wherein the option is valid for a limited time period; and outputting from the computer system, acceptance of the option to purchase the sales lead to the third party within the limited time period after receiving the option to purchase the sales lead, when the employment verification score is above a threshold.

8. The method of claim 1 wherein the limited time period is less than approximately 5 seconds.

Employment Verification Concept—Depository-Data Based Verification of User Represented Employer In some embodiments of the present invention, another source of data that may be used to verify an employer may be via Depository data (e.g. Bank deposits). In various embodiments, when an employer performs a direct deposit, the name of the employer, payment reference numbers, data, a deposit amount, etc. appear on the user's bank account. These are typically known as ACH header data. In various embodiments, using services such as, Yodlee.com, BillFlow.com, Mint.com, or the like, the ACH header data may be obtained by the verification server. Based upon this data, the verification server can verify the employer, based upon the employer name (using any one of the name matching schemes described herein) and the deposit amount. For example, if Yodlee.com-based data returns a direct deposit by an employer named Safeway, and the user-provided employer name is Safeway, the probability the user works for Safeway increases. In other embodiments, access to depository data may be performed directly upon bank web sites, such as WellsFargo.com, BoA.com, or the like, if the user provides appropriate account names and passwords (e.g. during the application process).

Employment Verification Concept—Evidentiary-Based Verification of User Represented Employer In some embodiments of the present invention, another source of data that may be used to verify an employer may be via direct evidence, such as a W2, pay stub, an employee identification card, a tax return, a company credit card, business card, or the like. In some embodiments, the user digitizes and submits the digital image to a receiving server. In various embodiments, the employer name derived for such submissions may be compared to any other source of employer name described herein. Additionally, the amounts of income may be also used to help determine whether the user is financially able to undertake the financial risk.

In some embodiments, in order to verify income or paycheck data, a user may be prompted to provide certain numbers on their latest pay check, or the like. The data that may be requested may include payer name, current amount or year to date deductions for FICA tax, Medicare, Federal tax, state tax; current or year to date earnings, net pay, or the like. In various alternative embodiments, the user may upload a scan or photo of their pay check, and these types of data may be derived from an OCR of the scan. In other embodiments, the user may simply enter the numbers based upon keyboard input.

The inventor has recognized that many of these numbers, such as Medicare deductions, Federal tax withheld, Unemployment insurance, and the like are based upon a known formula with regards to earnings. Accordingly, if a user submits such numeric data, embodiments of the present invention can help determine if the numbers submitted by the user are genuine or legitimate. If, for example, the deductions are much smaller than the amount expected based upon the user reported income, it is possible that the user reported income has been falsely inflated. Of course many deductions are subject to caps, accordingly, various embodiments may use more than one set of predicted deductions versus actual deductions to determine whether the paycheck data is accurate, or not.

As an example, a user making $1000 per month is subject to $21.50 in State withholding from the beginning of the year. Later, beginning in June, the State withholding is increased to $21.75. Later, in October, the user applies for a payday loan, and is asked to enter the year-to-date (YTD) state withholding number as of the end of September. Based upon the above assumptions, the correct amount on the paycheck stub should be (($21.50 per month×5 months)+($21.75 per month×4 months)=$194.50). Accordingly, if the YTD state withholding number entered (e.g. $200) is not the same as the calculated amount ($194.50), the probability that the pay check is genuine decreases, and often, the probability that the user works for the purported employer also decreases.

Additional Sources of Employment Verification Data

In various embodiments, any two or more sources of employment data, described above, may be compared to determine an employment verification score. For example, the user-provided employer name in an application may be compared to an employer associated with the user's corporate e-mail address; the user employer represented in a user's first social network profile may be compared to the user employer represented in a user's second social network profile; an employer name found on the user's W2 statement may be compared to an employer associated with the user's work telephone number; and the like.

In some embodiments, depending upon the verification score determined based upon two sources of employment data, one or more additional sources of employment data may also be used to determine the employment verification score. Such additional determination may be termed a "waterfall" analysis. As one example, a first user fills in "IBM" in an employment field on an application, and using one of the e-mail verification techniques described above, verifies their IBM e-mail address; and a second user fills in "Microsoft" in an employment field on an application, but their work telephone number is not associated with Microsoft. In such cases, the first user may have a high employment verification score, and thus no further employment verification may be asked of the first user, or performed. In contrast, the second user may have a low employment verification score, thus, the user may be asked for additional data for employment verification purposes, such an social network access, a user work e-mail address, or the like. Described below are additional verification sources. In some embodiments, any two of the herein disclosed verification sources may be used.

DROP down: In some embodiments, the steps described above may be modified. For example, initially a user may provide access to the user's social graphs (e.g. Facebook, LinkedIn, Plaxo, etc.), and employment data may be retrieved. Next, based upon the employment data, various fields of a user's financial application may be automatically filed in, drop boxes provided to the user may be automatically populated, or the like. In some embodiments, the user may be encouraged to use their social networks In such embodiments, another source of an employer name is a user selection of a drop-down menu or auto complete entry provided by embodiments of the present invention. In various embodiments, the user may be asked for their corporate e-mail address, or the like. Once the user provides this, a look-up is performed to determine what company or companies are associated with or own the domain name. Subsequently, when the user is asked via the web form, phone app, or the like, who they work for, the names of the company or companies automatically populate a drop-down menu. In another case, when the user begins to type letters, auto-complete suggestions are provided for the user to select from.

Embodiments of the auto-complete or drop-down menu may be helpful to help reduce the need for the fuzzy matching process described above in FIG. 2. As an example, if a person's employer e-mail address is Issac@ll.MIT.edu, a determination is made that the domain name is associated with "The Massachusetts Institute of Technology," and "Lincoln Laboratories." Then, in one embodiment, when the person is asked to enter their employer name, a drop down-menu containing either or both: "The Massachusetts Institute of Technology," and "Lincoln Laboratories," or the like In an auto-complete embodiment, when the person types in the letter "L," "Lincoln Laboratories" would automatically be filled-in for the user; when the person types the letter "T" or "M," "The Massachusetts Institute of Technology," would automatically be filled-in for the user. Embodiments are believed to be beneficial to reduce the ambiguity of user filled-in employer names. For example alternative employer names for the user in the example above include: "MIT," "M.I.T.," "MIT Lincoln Labs," "Lincoln Labs," "The MIT," "Massachusetts Institute of Technology," and the like.

In light of the present disclosure, one of ordinary skill in the art will now recognize that many additional types of employment verification techniques may be used in conjunction with the techniques described herein. For example, one technique may include providing the user name, the employer name, and the like to a verification provider. In various embodiments, the verification provider may be associated with an employment verification service (e.g. checking user name against an employment database for a fee), the verification provider may be associated with a call-center employment verification service (e.g. a third party service making a telephone call to the HR of the employer for a fee), the verification provider may simply be a person associated with the risk taker (e.g. an HR person of the risk taker making telephone calls to the HR of the employer); or the like.

Types of claims envisioned covering the above embodiments may include a generalized employment verification process:

1. A computer-implemented method for verifying employment of a user with a computer system programmed to perform the method comprising:

receiving with the computer system, a first plurality of employment-related data for the user;

determining with the computer system, a first name associated with an organization in response to the first plurality of employment-related data;

receiving with the computer system, a second plurality of employment-related data for the user;

determining with the computer system, a second name associated with an organization in response to the second plurality of employment-related data;

determining with the computer system, a relationship between the organization associated with the first name and the organization associated with the second name, in response to the first name and to the second name;

determining with the computer system, an employment verification indicator in response to the relationship between the organization associated with the first name to the organization associated to the second name; and outputting with the computer system, the employment verification indicator.

Types of First data:

2. The method of claim 1 wherein the first plurality of employment-related data is selected from a group consisting of: IP address associated with the user; a social network profile of the user associated with a first social network, and bank account depository data.

Additional types of First data:

3. The method of claim 1 wherein the first plurality of employment-related data is selected from a group consisting of: a web form submission by the user, a work e-mail address of the user, a work telephone number of the user, a publically-available data source pull down menu with employment related data, a fee-based data source, a work-related document (w2).

Types of SECOND data:

4. The method of claim 2 wherein the second plurality of employment-related data are not identical to the first plurality of employment-related data;

wherein the second plurality of employment-related data is selected from a group consisting of: IP address associated with the user; a social network profile of the user associated with a first social network, bank account depository data, a form submission by the user, a work e-mail address of the user, a work telephone number of the user, a publically-available data source, pull down menu with employment related data, a fee-based data source, a work-related document (w2).

Verification with at least three types of data:

5. The method of claim 1 further comprising: receiving with the computer system, a third plurality of employment-related data for the user;

determining with the computer system, a third name associated with an organization in response to the third plurality of employment-related data; and determining with the computer system, a relationship between the organization associated with the first name and the organization associated with the third name, in response to the first name and to the third name; and wherein determining with the computer system, the employment verification indicator is also in response to the relationship between the organization associated with the first name to the organization associated to the third name; and wherein the first plurality of employment-related data, the second plurality of employment-related data, and the third plurality of employment-related data are selected, without replacement, from a group consisting of: IP address associated with the user; a social network profile of the user associated with a first social network, bank account depository data, a form submission by the user, a work e-mail address of the user, a work telephone number of the user, a publically-available data source, pull down menu with employment related data, a fee-based data source, a tax-related document.

An ARIN lookup:

6. The method of claim 1 wherein the first plurality of employment-related data comprises an IP address associated with the user; and wherein determining with the computer system, the first name associated with the organization comprises:

providing with the computer system, the IP address associated with the user to a remote look-up server; and receiving with the computer system, the first name associated with the organization from the remote look-up server.

A Social Network lookup:

7. The method of claim 1 wherein the first plurality of employment-related data comprises a social network profile associated with the user; and wherein determining with the computer system, the first name associated with the organization comprises:

receiving with the computer system, an OAuth token associated with the user and a social network;

sending with the computer system, a request for the first plurality of employment data from the social network; and receiving with the computer system, the first plurality of employment-related data from the social network.

A bank account depository data lookup, e.g. Yodlee, Billflow

8. The method of claim 1 wherein the firs plurality of employment-related data comprises an identity of a financial account depositor; and wherein determining with the computer system, the first name associated with the organization comprises:

providing with the computer system, identity information of the user to a third-party server;

receiving with the computer system, transaction details of one or more financial account deposits to a financial account associated with the user, from the third-party server; and determining with the computer system, the first name associated with the organization in response to the details of the one or more financial account deposits.

Waterfalling to additional verification sources:

9. The method of claim 1 wherein when the employment verification indicator is less than a threshold, the method further comprises:

receiving with the computer system, a third plurality of employment-related data for the user;

determining with the computer system, a third name associated with an organization in response to the third plurality of employment-related data; and determining with the computer system, a relationship between the organization associated with the first name and the organization associated with the third name, in response to the first name and to the third name; and determining with the computer system, the employment verification indicator in response to the relationship between the organization associated with the first name to the organization associated to the third name.

Waterfalling to additional verification sources:

10. The method of claim 1 wherein when the employment verification indicator is less than a threshold, the method further comprises:

determining with the computer system a telephone number associated with the organization associated with the first name from a database; and outputting with the computer system, a report comprising a name of the user, the first name associated with the organization, and the telephone number, to a verification provider.

Waterfalling to additional verification sources:

11. The method of claim 1 wherein when the employment verification indicator is less than a threshold, the method further comprises:

outputting with the computer system, a report comprising a name of the user and the first name associated with the organization to an employment verification server.

Graphical user interfaces:

12. The method of claim 1 wherein outputting with the computer system, the employment verification indicator comprises:

generating with the computer system, a specification of a graphical user interface, in response to the employment verification indicator, wherein the graphical user interface includes a representation of the employment verification indicator; and providing with the computer system, the specification of the graphical user interface to a remote computer system.

Enabling computer systems:

13. A computer system coupled for verifying employment of a first user with a computer system programmed to perform the method comprising:

a memory configured to store executable software code; and a processor coupled to the memory, wherein the processor is instructed by the executable software code to receive a first plurality of employment-related data for the user;

wherein the processor is instructed by the executable software code to determine a first name associated with an organization in response to the first plurality of employment-related data;

wherein the processor is instructed by the executable software code to receive a second plurality of employment-related data for the user;

wherein the processor is instructed by the executable software code to determine a second name associated with an organization in response to the second plurality of employment-related data;

wherein the processor is instructed by the executable software code to determine a relationship between the organization associated with the first name and the organization associated with the second name, in response to the first name and to the second name;

wherein the processor is instructed by the executable software code to determine an employment verification indicator in response to the relationship between the organization associated with the first name to the organization associated to the second name; and wherein the processor is instructed by the executable software code to output the employment verification indicator.

GUI:

14. The computer system of claim 13 wherein the processor is instructed by the executable software code to determine a specification of a graphical user interface, wherein the graphical user interface includes the employment verification indicator, a name of the user, and the first name associated with the organization.

Employment Stability Concepts

In various embodiments employment stability may be also determined based upon social network data. For example, an indication may be calculated that reflects how often a user changes jobs. If a user changes jobs every 6 months, such a user would possibly be a higher default risk for loan repayment compared to a user who changes jobs every 4 years.

Additionally, employer stability may also be used within the financial risk analysis. For example, an indication may be calculated that reflects how stable the employer is. If a user currently works for Kodak, such a user would possibly a higher default risk for a mortgage repayment compared to a user who currently works for Facebook.

In other embodiments, other types of user representations in an application for a financial risk may also be verified, such as residence (and duration of residence), income history and sources, and the like. In still other embodiments, the above techniques may also be crowdsourced.

Types of claims envisioned covering the above embodiments may include determining stability of the applicant:

1. A computer-implemented method for determining a user work-stability indicator with a computer system programmed to perform the method comprising:

receiving with the computer system, a first plurality of social network data associated with a user from a first social network server, wherein the first plurality of social network data includes a plurality of names associated with organizations represented by the first user as employers on a user-profile on the first social network, wherein the first social network server comprises a network server associated with: Facebook, Google+, Twitter, LinkedIn, Plaxo, MySpace, and a plurality of dates associated with the plurality of names;

determining with the computer system, an employment stability indicator associated with the user in response to the plurality of names and plurality of dates; and outputting with the computer system, the employment verification indicator associated with the user.

Basing stability upon social network timelines

2. The computer-implemented method of claim 1 wherein the plurality of names associated with organizations is associated with a plurality of social network profiles associated with the user and associated with the plurality of dates.

Additional Concepts

Other embodiments may be applied to verify almost any type of assertion made by a user, such as educational background or educational enrollment. For example, in some embodiments, educational background may be verified using similar techniques described above, such as determining the number of social network contacts a user has that attend the educational institution, whether the user's friends communicate frequently with the user, or each other, whether the user has a student-specific-format e-mail address provided by the educational institution, and the like. Another embodiment of checking for educational background or educational enrollment might be the checking for the user's ability to send or receive email at an .edu address domain address.

In other embodiments, the techniques described here may be applied to background checking of the user for various purposes. In one embodiment, for an affinity group or special interest group, backgrounds of new members or potential members may be scrutinized before being considered for or extended membership. For example, an animal rights group may want to make sure that a new member or potential member is not a "spy" for a meat-packing lobbyist. In such a case, the rights group may check the social graph of the new member to see who the new member works for; check to see if the interest groups of the new member are related to animal-rights; check to see if friends of the new member have interests in animal-rights/environmental rights; or the like. If, for example, the new member is found to post pictures involving hunting; the new member is found to have many friends in the NRA; or the like, the animal rights group may decide to not accept the member or kick the member out. As another example, a conservative political group may want to give event tickets to people who are politically conservative, and to exclude people who may protest, e.g. politically progressive. In such a case, the conservative group exclude people who work for particular employers (e.g. The Sierra Club"), exclude people who are connected to certain people (e.g. are socially connected to: a Kennedy), or the like. In some cases, the conservative group may include people who are "Fans" of Rush Limbaugh, or the like, or the like.

In various embodiments, the above background checking techniques may be performed automatically processing the derived data using various affinity group related-ness scores, by processing the derived data via Klout.com-relatedness, or the like.

The above embodiments may also be used to help determine which persons to hire, who to extend housing to, or the like. Various embodiments should, of course, should comply with all laws and regulations regarding non-discrimination based upon protected classes (e.g. age, sex, ethnic background, etc.).

Types of claims envisioned covering the above embodiments may include determining incompatibility of an applicant:

1. The computer-implemented method for determining membership disqualification with a computer system programmed to perform the method comprising:

receiving with the computer system, an application for membership in a special interest group;

receiving with the computer system, a first plurality of social network data associated with the user from a first social network server, wherein the first plurality of social network data includes a plurality of interest groups selected by the first user, wherein the first social network server comprises a network server associated with: Facebook, Google+, Twitter, LinkedIn, Plaxo, MySpace, and a plurality of dates associated with the plurality of names;

determining with the computer system, an incompatibility indicator is in response to whether the plurality of interest groups is incompatible with the special interest group; and outputting with the computer system, the incompatibility indicator to a moderator associated with the special interest group.

Based upon friends of the applicant:

2. The computer-implemented method of claim 1 receiving with the computer system, a first plurality of social network data associated with the user from a first social network server, wherein the first plurality of social network data includes a first plurality of social contacts associated with the first user;

receiving with the computer system, a second plurality of social network data associated with a first contact from the plurality of social contacts, wherein the second plurality of social network data comprises a plurality of interest groups associated with the first contact; and wherein determining with the computer system, the incompatibility indicator is also in response to whether the plurality of interest groups associated with the first contact is incompatible with the special interest group.

In various embodiments, the fuzzy logic matching that is applied to corporate name matching (e.g. IBM v. International Business Machines), and/or is applied to personal name matching (e.g. Steve v. Stephen v. Steven) may be performed by third-party vendors.

In the present disclosure, the following definitions are provided:

"A user-application" refers herein to a form completed by the user where the user provides the name of their employer. Some ways the user may do this includes a web form submission; a text entry via an phone "app;" a text entry or fill-in-the-dot paper form, followed by scanning/optical character recognition; or the like, A user represents that he/she is employed by that employer on such a user-application.

"Social connections" or "social contacts" include, but is not limited to, Facebook friends, LinkedIn Contacts, Twitter followers, etc. of the user. Social connections or social contacts can imply co-workers or fellow employees of the user. In various embodiments, it is believed that the more Facebook friends, LinkedIn connections or other social media connections that a user has at that same employer, the more likely it is that the user actually works for that employer. In some embodiments, as the number of interactions with these social connections (co-workers) within the social network increases, the likelihood of the person working at the employer may be deemed to increase.

In other embodiments, other types of social networks or common-interest groups may be used to determine how connected an applicant (e.g. user) is to others who work at the purported employer. Similar to the above, based upon a first social network of an applicant, social contacts User A and User B are found to work at the same purported employer. Next, if within a second social network, the applicant and users A and B are determined to interact frequently, the probability of the applicant working at the employer is higher. In some embodiments, these types of common-interest groups may include: fraternal organizations (e.g. Rotary Club), ham radio organizations, teachers' unions or teachers' organizations, mall-walking groups, religious organizations (e.g. Jewish War Veterans), or the like.

In still other embodiments, membership of a user in a group closely-linked with the purported employer may also increase the probability of the user working with the purported employer. For example, if an applicant (e.g. user) claims to work for Chicago Board of Education, the applicant may have an increased employment verification score if the applicant can also prove membership with the the Teachers' Union, or the like.

"oAuth" is a token supplied by the user that enables a computer system that is provided with that token, access to user-authorized data of the social network of the user.

"Publically available social network data" includes social network data can be accessed by the computer system without user permission, e.g. a social connection. This can include data that users of the social network can access or non-users of the social network can access. This can also include data from fee-based databases or data aggregators, data from search engines, or the like.

The present invention relates to employment verification and/or scoring. The methods described below are computer-implemented techniques performed on one or more computer systems that are specifically programmed by executable software code to perform the functions described below. A general-purpose computer having a processor, a memory, and a network connection may be programmed by this executable software code to become a special purpose computer system that performs this functionality. In some embodiments, the general-purpose computer may include a display, a user entry device (e.g. keyboard, mouse), and the like. In some embodiments, the special purpose computer system may communicate with other special purpose computer systems, such as a database, remote server, a user machine, a security server, or the like, via the network connection. Some embodiments may be executed on such a general-purpose computer and the functionality of such embodiments may be available via one or more callable application program interfaces (APIs) or XML call. In certain cases, an API call might be performed in a form of an XLM call.

Figure 7:
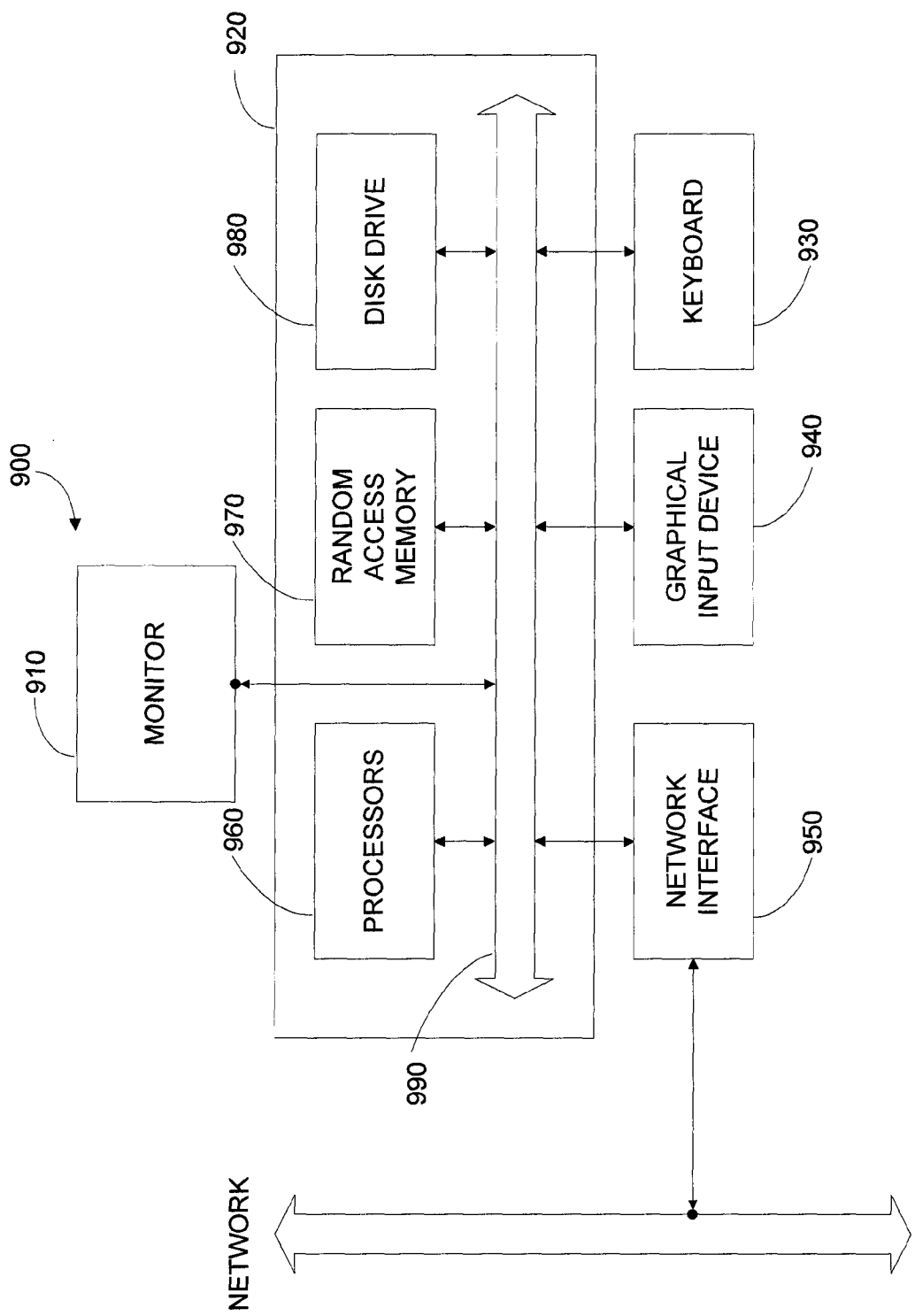
FIG. 7 is a block diagram of typical computer system 900 according to various embodiment of the present invention.

FIG. 7 is a block diagram of typical computer system 900 according to various embodiment of the present invention. In various embodiments, computer system 900 typically includes a monitor 910, computer 920, a keyboard 930, a user input device 940, a network interface 950, and the like. Computer system 900 may be used by a user to provide a graphical user interface for the application process; or may be used by a verification service or the risk taker to generate the user graphical user interfaces, to send data to and receive data from a social network server, to determine verification scores/indicators, as described herein; or the like.

In the present embodiment, user input device 940 is typically embodied as a computer mouse, a trackball, a track pad, wireless remote, and the like. User input device 940 typically allows a user to select objects, icons, text, control points and the like that appear on the monitor 910. In some embodiments, monitor 910 and user input device 940 may be combined such as with an interactive touch screen display or pen based display such as a Cintiq marketed by Wacom, or the like.

Embodiments of network interface 950 typically include an Ethernet card, a modem (telephone, satellite, cable, ISDN), (asynchronous) digital subscriber line (DSL) unit, and the like. Network interface 950 is typically coupled to a computer network as shown. In other embodiments, network interface 950 may be physically integrated on the motherboard of computer 920, may be a software program, such as soft DSL, or the like.

Computer 920 typically includes familiar computer components such as a processor 960, and memory storage devices, such as a random access memory (RAM) 970, disk drives 980, and system bus 990 interconnecting the above components.

In one embodiment, computer 920 is a PC compatible computer having multiple microprocessors such as Core™ microprocessor from Intel Corporation. Further, in the present embodiment, computer 920 may include a UNIX-based operating system. RAM 970 and disk drive 980 are examples of tangible media for storage of non-transient: images, operating systems, configuration files, embodiments of the present invention, including computer-readable executable computer code that programs computer 920 (e.g. processors 960) to perform the above described functions and processes, and the like. For example, the computer-executable code may include code that directs the computer system to perform various functions such as receiving input data from a user, calling APIs of a social network, receiving social network data, sending and receiving of e-mail messages, and any of the processing steps described herein; or the like.

Other types of tangible media include floppy disks, removable hard disks, optical storage media such as CD-ROMS, DVDs, Blu-Ray disks, semiconductor memories such as flash memories, read-only memories (ROMS), battery-backed volatile memories, networked storage devices, and the like.

In the present embodiment, computer system 900 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 7 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as Windows7®, Windows8®, or the like from Microsoft Corporation, Solaris from Oracle, LINUX, UNIX, MAC OS from Apple Corporation, and the like. Other embodiments may include portable devices such as phones, tablets, and the like. For example, computer system 900 may include iOS devices (e.g. iPhone, iPod, iPad), Android devices (e.g. GalaxyS3, Razr), WindowsMobile devices (e.g. Lumina), or the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A computer-implemented method for verifying employment of a first user with a computer system programmed to perform the method comprising:
receiving with the computer system, a first name associated with an organization represented by the first user as an employer on a user-application;
receiving with the computer system, a first plurality of social network data associated with the first user from a first social network server, wherein the first plurality of social network data includes a first plurality of social connections associated with the first user, the first plurality of social connections including one or more second users, wherein the first plurality of social network data further includes a second name associated with the organization represented by the first user as the employer on a user-profile on the first social network server and a second-user organization name associated with the organization represented by the one or more second users as the employer on one or more second-user profiles on the first social network server;
determining with the computer system, a relationship between the organization associated with the first name and the organization associated with the second name, in response to the first name and the second name received;
determining with the computer system, a corroboration indicator by identifying a percentage of the one or more second users having the second-user organization name match with the first name associated with the organization represented by the first user as the employer on the user-application;
determining with the computer system, an employment verification indicator based on the relationship and the corroboration indicator determined; and
outputting with the computer system, the employment verification indicator.

2. The computer-implemented method of claim 1 wherein determining with the computer system, whether the organization associated with the first name is related to the organization associated with the second name comprises comparing with the computer system, the first name and the second name to a database of organization relationship data, wherein the organization relationship data are selected from a group consisting of: a subsidiary organization, a parent of, assignee of, a joint venture of, a DBA of, an affiliate of, partner of, a representative, a licensee, an agent of.

3. The computer-implemented method of claim 1 wherein determining with the computer system, a relationship between the organization associated with the first name and the organization associated with the second name comprises:
processing with the computer system, the second name to determine one or more modified second names, wherein the second name is related to the one or more modified second names in a manner selected from a group consisting of: a misspelling, a different spelling, a nick name, a short name, a long name, a colloquial name, a substring, a superstring, a different language, a dissimilar corporate structure, a fuzzy-logic processed name, a homonym, a SoundEx relation, Metaphone, fuzzy matching, Levenshtein distance; and
determining with the computer system, whether the one or more modified second names are related to the first name.

4. The computer-implemented method of claim 1,
wherein the first plurality of social connections comprises a second user and a third user;

wherein a second name associated with an organization represented by the second user as an employer and a third name associated with an organization represented by the third user as an employer are both related to the first name associated with the organization represented by the first user the as the employer; and wherein the method further comprising:

receiving with the computer system, a second plurality of social network data from the first social network server associated with the second user, wherein the second plurality of social network data includes a second plurality of social connections;

receiving with the computer system, a third plurality of social network data from the first social network server associated with the third user, wherein the third plurality of social network data includes a third plurality of social connections;

determining with the computer system whether the second plurality of social connections comprises the third user; and determining with the computer system whether the third plurality of social connections comprises the second user;

determining with the computer system, a support indicator in response to the second plurality of social connections comprising the third user and to the third plurality of social connections comprising the second user; and wherein the determining with the computer system, the employment verification indicator is also in response to the support indicator.

5. The computer-implemented method of claim 1, wherein the method further comprising:

determining with the computer system, a communication quality indicator between the first user and the one or more second users; and wherein the determining with the computer system, the employment verification indicator is also based on the communication quality indicator.

6. The computer-implemented method of claim 1 further comprising:

receiving with the computer system, an OAuth token associated with the first user and the first social network server;

requesting with the computer system, the first plurality of social network data from the first social network server in response to the OAuth token.

7. The computer-implemented method of claim 1 wherein the first plurality of social network data from the first social network server comprises publically available social network data associated with the first user from the first social network server.

8. The computer-implemented method of claim 1 wherein the first plurality of social network data includes a time indicator indicating when or how long ago did the first user associate the second name with the organization represented by the first user as the employer on the user-profile; and wherein determining with the computer, the employment verification indicator is also in response to the time indicator.

9. The computer-implemented method of claim 1 wherein the first plurality of social network data is selected from a group consisting of: a tweet stream, a wall post, a profile, a position, an e-mail domain name, bank account transactions of the user, an online search of the user and the first name associated with an organization represented by the first user as an employer.

10. The computer-implemented method of claim 1 wherein when the employment verification indicator is below a threshold, the method further comprises initiating with the computer system additional employment verification procedures.

11. The computer-implemented method of claim 10 wherein the additional employment verification procedures are selected from a group consisting of:

determining with the computer system, an IP address associated with the user;

initiating with the computer system, an e-mail verification process in response to a user-provided e-mail address;

determining and outputting with the computer system, a telephone number associated with the organization to a call center;

initiating with the computer system, a public search on one or more publically available databases for information associated with the first user;

initiating with computer system, a request to the user for a copy of income verification records;

determining with the computer system, an organization associated with a domain name of an e-mail address provided by the first user;

determining with the computer system, an organization associated with a telephone number provided by the first user;

determining with the computer system, an organization associated with employer direct deposits into a financial account of the first user.

12. The computer-implemented method of claim 1 wherein the employment verification indicator comprises a non-binary score.

13. The computer-implemented of claim 1 further comprising:

receiving with the computer system, a second plurality of social network data from a second social network server, wherein the second plurality of social network data includes a third name associated with an organization represented by the first user as an employer on a user-profile on the second social network;

determining with the computer system, whether the organization associated with the first name is related to the organization associated with the third name, in response to the first name and to the third name; and wherein determining with the computer system, the employment verification indicator is also in response to the relatedness determination of the organization associated with the first name to the organization associated with the third name.

14. The computer-implemented method of claim 1 wherein the user-application comprises a web form submission; and wherein the method further comprises:

receiving with the computer system, an OAuth token associated with the first user and the first social network server; and requesting with the computer system, the first plurality of social network data from the first social network server in response to the OAuth token;

wherein determining with the computer system, whether the organization associated with the first name is related to the organization associated with the second name comprises performing a fuzzy logic matching process in response to the first name and to the second name; and wherein the first social network server is associated with a company selected from a group consisting of: Facebook, LinkedIn.

15. The computer-implemented method of claim 1 further comprising:
   determining with the computer system, an approximate size associated with the organization associated with the first name, wherein the approximate size is selected from a group consisting of: number of employees, financial data, market capitalization; and
   wherein determining with the computer system, the employment verification indicator is increased in response to the approximate size being larger than a threshold.

16. A computer system coupled to a first social network server for verifying employment of a first user with a computer system programmed to perform the method user comprising:
   a memory configured to store a first name associated with an organization represented by the first user as an employer on a user-application; and
   a processor coupled to the memory,
   wherein the processor is instructed by executable software code to receive, a first plurality of social network data associated with the first user from a first social network server, wherein the first plurality of social network data includes a first plurality of social connections associated with the first user, the first plurality of social connections including one or more second users, wherein the first plurality of social network data further includes a second name associated with the organization represented by the first user as the employer on a user-profile on the first social network server and a second-user organization name associated with the organization represented by the one or more second users as the employer on one or more second-user profiles on the first social network server;
   wherein the processor is instructed by the executable software code to determine whether the organization associated with the first name is related to the organization associated with the second name, in response to the first name and to the second name received, and to determine a corroboration indicator by identifying a percentage of the one or more second users having the second-user organization name match with the first name associated with the organization represented by the first user as the employer on the user-application;
   wherein the processor is instructed by the executable code to determine an employment verification indicator based on a relatedness determination of the organization associated with the first name to the organization associated to the second name and the corroboration indicator determined, and
   wherein the processor is instructed by the executable code to output, the employment verification indicator.

17. The computer system of claim 16
   wherein the memory is configured to store an oAuth token associated with the first user and with the first social network server; and
   wherein the processor is instructed by the executable software code to output the oAuth token to the first social network server;
   wherein the processor is instructed by the executable software code to output one or more first social network server API calls to the first social network server.

* * * * *